United States Patent
Kirner et al.

(10) Patent No.: US 9,882,919 B2
(45) Date of Patent: Jan. 30, 2018

(54) DISTRIBUTED NETWORK SECURITY USING A LOGICAL MULTI-DIMENSIONAL LABEL-BASED POLICY MODEL

(71) Applicant: Illumio, Inc., Sunnyvale, CA (US)

(72) Inventors: Paul J. Kirner, Palo Alto, CA (US); Daniel R. Cook, San Jose, CA (US); Juraj G. Fandli, Campbell, CA (US); Matthew K. Glenn, Mountain View, CA (US); Mukesh Gupta, Milpitas, CA (US); Andrew S. Rubin, Palo Alto, CA (US); Jerry B. Scott, Los Altos, CA (US); Thukalan V. Verghese, San Carlos, CA (US)

(73) Assignee: Illumio, Inc., Sunnyvale, CA (US)

( * ) Notice: Subject to any disclaimer, the term of this patent is extended or adjusted under 35 U.S.C. 154(b) by 43 days.

(21) Appl. No.: 14/474,916

(22) Filed: Sep. 2, 2014

(65) Prior Publication Data
US 2014/0373091 A1    Dec. 18, 2014

Related U.S. Application Data

(63) Continuation-in-part of application No. 14/249,128, filed on Apr. 9, 2014, and a continuation-in-part of application No. 14/249,145, filed on Apr. 9, 2014.
(Continued)

(51) Int. Cl.
*G06F 17/00* (2006.01)
*H04L 29/06* (2006.01)
(Continued)

(52) U.S. Cl.
CPC ...... *H04L 63/1416* (2013.01); *H04L 41/0893* (2013.01); *H04L 61/1511* (2013.01); *H04L 61/2514* (2013.01)

(58) Field of Classification Search
None
See application file for complete search history.

(56) References Cited

U.S. PATENT DOCUMENTS

| | | |
|---|---|---|
| 7,418,490 B1 | 8/2008 | Zhang et al. |
| 7,747,736 B2 | 6/2010 | Childress et al. |

(Continued)

FOREIGN PATENT DOCUMENTS

| | | |
|---|---|---|
| CN | 1483270 | 3/2004 |
| CN | 101411156 | 4/2009 |

(Continued)

OTHER PUBLICATIONS

Dell Kace, "Dell Kace K1000 Series Management Appliance Architecture," 2010, 15 Pages, can be retrieved at <URL:http://partnerdirect.dell.com/sites/channel/Documents/Emerging_Documents/WP_Dell_KACE_K1000 Series_Architecture.pdf>.
(Continued)

*Primary Examiner* — Fatoumata Traore
(74) *Attorney, Agent, or Firm* — Fenwick & West LLP

(57) ABSTRACT

A managed server (MS) within an administrative domain is quarantined. The administrative domain includes multiple MSs that use management instructions to configure management modules so that the configured management modules implement an administrative domain-wide management policy that comprises a set of one or more rules. The quarantined MS is isolated from other MSs. A description of the MS is modified to indicate that the MS is quarantined, thereby specifying a description of the quarantined MS. Cached actor-sets are updated to indicate the quarantined MS's changed state, thereby specifying updated actor-sets. A determination is made regarding which updated actor-sets are relevant to an other MS, thereby specifying currently-relevant updated actor-sets. A determination is made regarding whether the currently-relevant updated actor-sets differ
(Continued)

from actor-sets previously sent to the other MS. Responsive to determining that the currently-relevant updated actor-sets are identical to the previously-sent actor-sets, no further action is taken.

20 Claims, 11 Drawing Sheets

Related U.S. Application Data

(60) Provisional application No. 61/899,468, filed on Nov. 4, 2013, provisional application No. 61/810,480, filed on Apr. 10, 2013, provisional application No. 61/899,468, filed on Nov. 4, 2013, provisional application No. 61/810,480, filed on Apr. 10, 2013, provisional application No. 61/899,468, filed on Nov. 4, 2013.

(51) Int. Cl.
*H04L 12/24* (2006.01)
*H04L 29/12* (2006.01)

(56) References Cited

U.S. PATENT DOCUMENTS

| | | | |
|---|---|---|---|
| 7,813,484 B2 | 10/2010 | Jackson et al. | |
| 8,539,545 B2 | 9/2013 | Kartha et al. | |
| 8,677,499 B2 | 3/2014 | Lim | |
| 8,843,561 B2 | 9/2014 | Chen et al. | |
| 9,124,636 B1* | 9/2015 | Rathor | H04L 63/20 |
| 2002/0065878 A1 | 5/2002 | Paxhia et al. | |
| 2003/0018792 A1 | 1/2003 | Shiouchi et al. | |
| 2003/0115484 A1 | 6/2003 | Moriconi et al. | |
| 2003/0231212 A1 | 12/2003 | Slemmer et al. | |
| 2004/0039789 A1 | 2/2004 | Jackson et al. | |
| 2004/0039798 A1 | 2/2004 | Hotz et al. | |
| 2004/0039803 A1 | 2/2004 | Law | |
| 2006/0262786 A1 | 11/2006 | Shimizu et al. | |
| 2007/0156670 A1 | 7/2007 | Lim | |
| 2007/0282986 A1 | 12/2007 | Childress et al. | |
| 2008/0060080 A1 | 3/2008 | Lim | |
| 2008/0109396 A1 | 5/2008 | Kacin | |
| 2008/0184277 A1 | 7/2008 | Burns et al. | |
| 2008/0195755 A1 | 8/2008 | Lu et al. | |
| 2008/0282336 A1 | 11/2008 | Diaz Cuellar et al. | |
| 2008/0294920 A1 | 11/2008 | Hatasaki et al. | |
| 2009/0198804 A1* | 8/2009 | Danforth | H04L 63/10 709/221 |
| 2009/0210520 A1 | 8/2009 | Maeno | |
| 2009/0217346 A1* | 8/2009 | Manring | H04L 61/2015 726/1 |
| 2009/0222795 A1 | 9/2009 | Frank et al. | |
| 2010/0064009 A1 | 3/2010 | Chen et al. | |
| 2010/0168876 A1 | 7/2010 | Nakano et al. | |
| 2010/0333165 A1 | 12/2010 | Basak et al. | |
| 2011/0078309 A1 | 3/2011 | Bloch et al. | |
| 2011/0296005 A1 | 12/2011 | Labovitz et al. | |
| 2012/0023546 A1 | 1/2012 | Kartha et al. | |
| 2012/0030731 A1 | 2/2012 | Bhargava et al. | |
| 2012/0131164 A1 | 5/2012 | Bryan et al. | |
| 2012/0210425 A1 | 8/2012 | Porras et al. | |
| 2012/0255012 A1 | 10/2012 | Sallam | |
| 2013/0081102 A1 | 3/2013 | Beauvais et al. | |
| 2013/0159039 A1 | 6/2013 | Brech et al. | |
| 2014/0049394 A1 | 2/2014 | Snyder et al. | |
| 2014/0053226 A1* | 2/2014 | Fadida | H04L 67/34 726/1 |
| 2014/0280305 A1 | 9/2014 | James et al. | |
| 2014/0282519 A1 | 9/2014 | Apte et al. | |
| 2014/0310408 A1 | 10/2014 | Kirner et al. | |
| 2014/0310415 A1 | 10/2014 | Kirner et al. | |
| 2015/0012332 A1 | 1/2015 | Papachristos | |
| 2015/0188789 A1 | 7/2015 | Jayaprakash | |

FOREIGN PATENT DOCUMENTS

| | | |
|---|---|---|
| CN | 101595465 | 12/2009 |
| CN | 102204267 | 9/2011 |
| CN | 102379139 | 3/2012 |
| JP | 2002507295 | 3/2002 |
| JP | 2011243112 | 12/2011 |
| JP | 201243445 | 3/2012 |
| KR | 10-20140099325 | 8/2014 |
| TW | 200839632 | 10/2008 |
| TW | 201310944 | 3/2013 |
| WO | WO 98/54644 A1 | 12/1998 |
| WO | WO 2005/112390 A1 | 11/2005 |

OTHER PUBLICATIONS

PCT International Search Report and Written Opinion for PCT/US2014/33524, dated Sep. 11, 2014, 18 Pages.
PCT International Search Report and Written Opinion for PCT/US2014/33540, dated Sep. 11, 2014, 12 Pages.
U.S. Appl. No. 14/528,879, filed Oct. 30, 2014, Kirner et al.
U.S. Appl. No. 14/527,372, filed Oct. 29, 2014, Kirner et al.
U.S. Appl. No. 14/531,832, filed Nov. 3, 2014, Scott et al.
Invitation to Pay Additional Fees and, Where Applicable, Protest Fee, PCT/US2014/054505, Apr. 23, 2015, 2 Pages.
PCT International Search Report and Written Opinion for PCT/US14/54505, dated Jun. 26, 2015, 15 Pages.
Search Report for ROC (Taiwan) Patent Application. No. 103132517, dated Sep. 4, 2015, 7 pages (With Concise Explanation of Relevance).
Office Action for Taiwanese Patent Application No. TW 103113296, dated Sep. 23, 2015, 28 Pages.
Patent Examination Report No. 1 for Australian Patent Application No. AU 2014251011, dated Nov. 26, 2015, 2 Pages.
Office Action for Canadian Patent Application No. CA 2,908,871, dated Dec. 11, 2015, 4 Pages.
Search Report for ROC (Taiwan) Patent Application. No. 103132517, dated Sep. 4, 2015, 11 pages.
Office Action for U.S. Appl. No. 14/249,128, dated Feb. 2, 2016, 8 Pages.
Extended European Search Report for European Patent Application No. EP 14782899.0, dated Apr. 11, 2016, 11 Pages.
Office Action for Canadian Patent Application No. CA 2,903,411, dated May 26, 2016, 3 Pages.
Office Action for Canadian Patent Application No. CA 2,908,871, dated Jun. 13, 2016, 4 Pages.
Office Action for Japanese Patent Application No. JP 2016-507639, dated Jun. 14, 2016, 4 Pages.
Office Action for U.S. Appl. No. 14/249,145, dated Jun. 3, 2016, 10 Pages.
Office Action for U.S. Appl. No. 14/249,128, dated Aug. 25, 2016, 9 Pages
Office Action for Canadian Patent Application No. CA 2,908,871, dated Dec. 22, 2016, 4 Pages.
European Search Report for European Patent Application No. EP 14782219, dated Nov. 25, 2016, 14 Pages
Communication Pursuant to Article 94(3) EPC for European Patent Application No. EP 14782899.0, dated Feb. 10, 2017, 7 Pages.
Office Action for U.S. Appl. No. 14/249,128, dated Apr. 6, 2017, 11 Pages.
First Office Action for Chinese Patent Application No. CN 2014800300432, dated Apr. 21, 2017, 24 Pages.
First Office Action for Chinese Patent Application No. CN 2014800179325, Apr. 7, 2017, 11 Pages.
Office Action for Canadian Patent Application No. CA 2,903,411, dated May 1, 2017, 5 Pages.
Partial Supplementary European Search Report for European Patent Application No. EP 14863433.0, dated Apr. 12, 2017, 8 Pages.
Extended European Search Report for European Patent Application No. EP 14863433.0, Jul. 7, 2017, 15 Pages.
Invitation pursuant to Article 94(3) and Rule 71(1) EPC for European Patent Application No. EP 14782899.0, dated Aug. 23, 2017, 10 Pages.

(56) References Cited

OTHER PUBLICATIONS

First Office Action for Chinese Patent Application No. CN 201480060318.7, dated Nov. 13, 2017, 26 Pages (With English Translation).
Communication pursuant to Article 94(3) EPC for European Patent Application No. EP 14782219.1, Dec. 5, 2017, 5 Pages.

* cited by examiner

DISTRIBUTED NETWORK SECURITY USING A LOGICAL MULTI-DIMENSIONAL LABEL-BASED POLICY MODEL

RELATED APPLICATIONS

This application claims the benefit of U.S. Provisional Application No. 61/899,468, filed Nov. 4, 2013, which is incorporated by reference herein in its entirety. This application is a continuation-in-part of U.S. application Ser. No. 14/249,128, filed Apr. 9, 2014, which is incorporated by reference herein in its entirety and claims the benefit of U.S. Provisional Application No. 61/810,480, filed Apr. 10, 2013, and U.S. Provisional Application No. 61/899,468, filed Nov. 4, 2013. This application is a continuation-in-part of U.S. application Ser. No. 14/249,145, filed Apr. 9, 2014, which is incorporated by reference herein in its entirety and claims the benefit of U.S. Provisional Application No. 61/810,480, filed Apr. 10, 2013, and U.S. Provisional Application No. 61/899,468, filed Nov. 4, 2013.

BACKGROUND

1. Technical Field

The subject matter described herein generally relates to the field of managing servers (physical or virtual) of an administrative domain and, in particular, to managing servers according to an administrative domain-wide policy that adheres to a logical multi-dimensional label-based policy model.

2. Background Information

Servers (physical or virtual) of an administrative domain are managed according to a policy. For example, a security policy might specify access control and/or secure connectivity, while a resource-usage policy might specify usage of the administrative domain's computing resources (e.g., disks and/or peripherals). Conventional policies reference physical devices and are expressed in terms of low-level constructs such as Internet Protocol (IP) addresses, IP address ranges, subnetworks, and network interfaces. These low-level constructs make it difficult to write a fine-grained policy in an abstract and natural way.

SUMMARY

The above and other issues are addressed by a method, non-transitory computer-readable storage medium, and system for quarantining a managed server within an administrative domain. The administrative domain includes a plurality of managed servers that use management instructions to configure management modules so that the configured management modules implement an administrative domain-wide management policy that comprises a set of one or more rules. The quarantined managed server is isolated from other managed servers in the plurality of managed servers. An embodiment of the method comprises modifying a description of the managed server to indicate that the managed server is quarantined, thereby specifying a description of the quarantined managed server. The method further comprises updating cached actor-sets to indicate the quarantined managed server's changed state, thereby specifying updated actor-sets. The method further comprises determining which updated actor-sets are relevant to an other managed server, thereby specifying currently-relevant updated actor-sets. The method further comprises determining whether the currently-relevant updated actor-sets differ from actor-sets previously sent to the other managed server. The method further comprises responsive to determining that the currently-relevant updated actor-sets are identical to the previously-sent actor-sets, taking no further action.

An embodiment of the medium stores computer program modules executable to perform steps. The steps comprise modifying a description of the managed server to indicate that the managed server is quarantined, thereby specifying a description of the quarantined managed server. The steps further comprise updating cached actor-sets to indicate the quarantined managed server's changed state, thereby specifying updated actor-sets. The steps further comprise determining which updated actor-sets are relevant to an other managed server, thereby specifying currently-relevant updated actor-sets. The steps further comprise determining whether the currently-relevant updated actor-sets differ from actor-sets previously sent to the other managed server. The steps further comprise responsive to determining that the currently-relevant updated actor-sets are identical to the previously-sent actor-sets, taking no further action.

An embodiment of the system comprises a non-transitory computer-readable storage medium storing computer program modules executable to perform steps. The steps comprise modifying a description of the managed server to indicate that the managed server is quarantined, thereby specifying a description of the quarantined managed server. The steps further comprise updating cached actor-sets to indicate the quarantined managed server's changed state, thereby specifying updated actor-sets. The steps further comprise determining which updated actor-sets are relevant to an other managed server, thereby specifying currently-relevant updated actor-sets. The steps further comprise determining whether the currently-relevant updated actor-sets differ from actor-sets previously sent to the other managed server. The steps further comprise responsive to determining that the currently-relevant updated actor-sets are identical to the previously-sent actor-sets, taking no further action.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
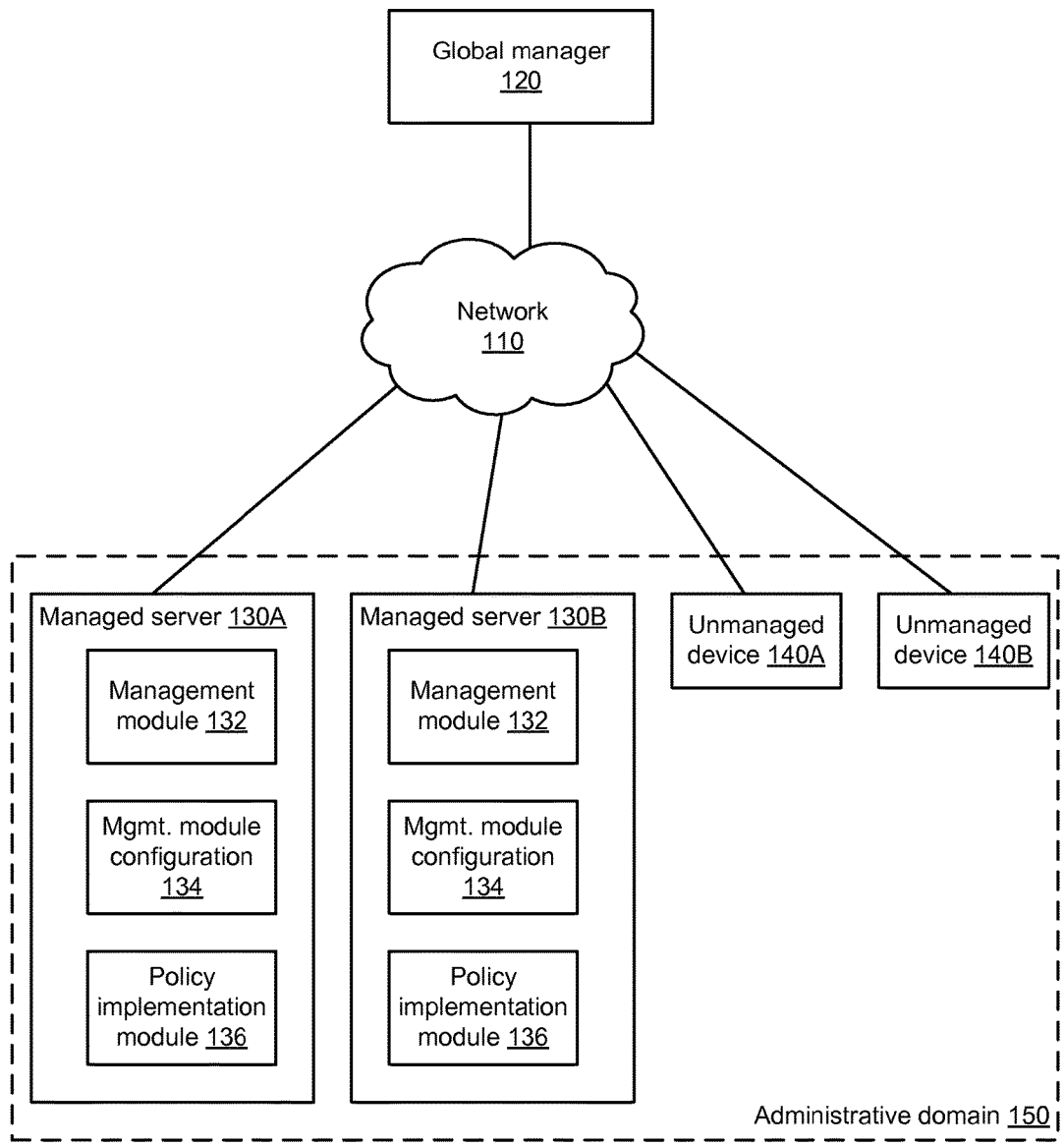
FIG. 1 is a high-level block diagram illustrating an environment for managing servers (physical or virtual) of an administrative domain, according to one embodiment.

FIG. 1 is a high-level block diagram illustrating an environment 100 for managing servers (physical or virtual) 130 of an administrative domain 150, according to one embodiment. The administrative domain 150 can correspond to an enterprise such as, for example, a service provider, a corporation, a university, or a government agency. The environment 100 may be maintained by the enterprise itself or by a third party (e.g., a second enterprise) that helps the enterprise manage its servers 130. As shown, the environment 100 includes a network 110, a global manager 120, multiple managed servers 130, and multiple unmanaged devices 140. The multiple managed servers 130 and the multiple unmanaged devices 140 are associated with the administrative domain 150. For example, they are operated by the enterprise or by a third party (e.g., a public cloud service provider) on behalf of the enterprise. While one global manager 120, two managed servers 130, and two unmanaged devices 140 are shown in the embodiment depicted in FIG. 1 for clarity, other embodiments can have different numbers of global managers 120, managed servers 130, and/or unmanaged devices 140.

The network 110 represents the communication pathway between the global manager 120, the managed servers 130, and the unmanaged devices 140. In one embodiment, the network 110 uses standard communications technologies and/or protocols and can include the Internet. In another embodiment, the entities on the network 110 can use custom and/or dedicated data communications technologies.

Figure 3:
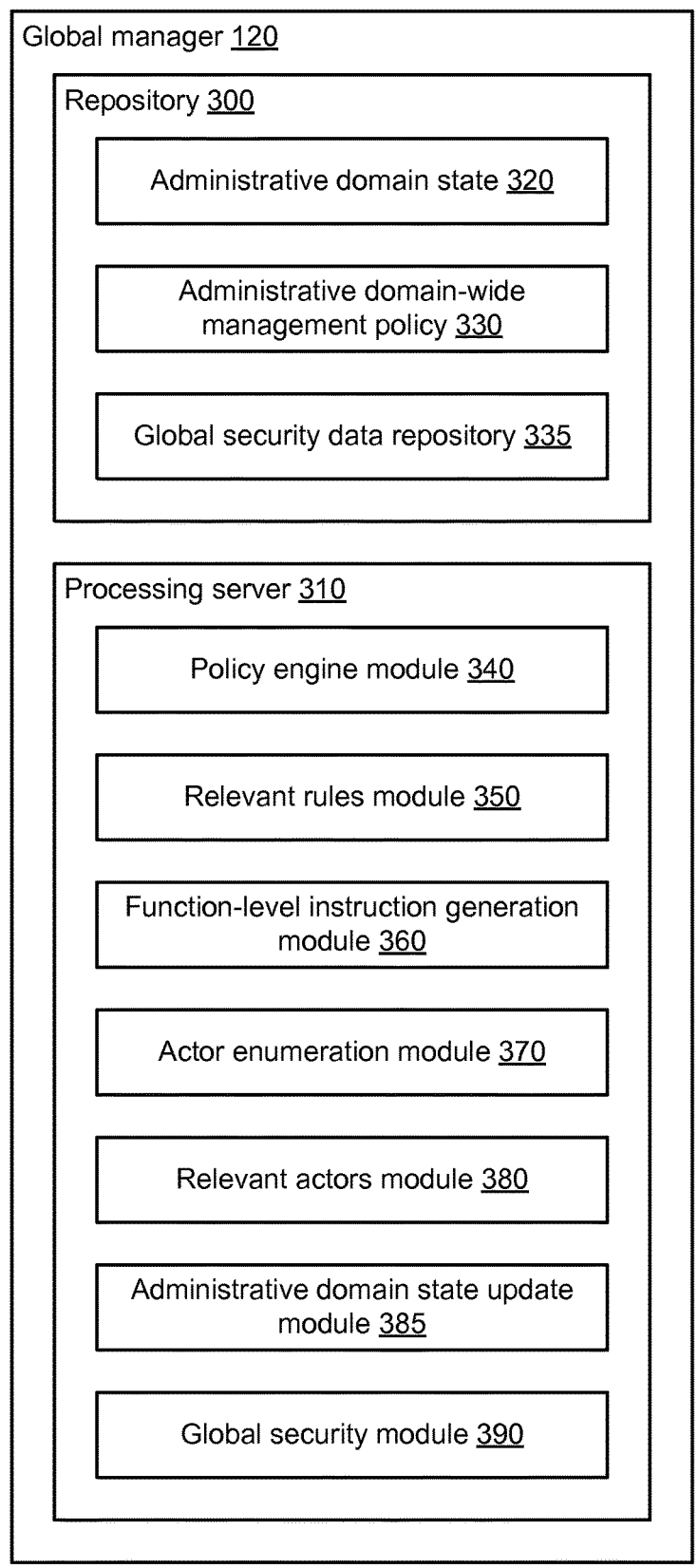
FIG. 3 is a high-level block diagram illustrating a detailed view of a global manager, according to one embodiment.

A managed server 130 is a machine (physical or virtual) that implements an administrative domain-wide management policy 330 (shown in FIG. 3). In one embodiment, a server is a user-space instance of a virtual server (sometimes referred to as a container, virtualization engine, virtual private server, or jail) according to operating system-level virtualization, which is a server virtualization method where the kernel of an operating system enables multiple isolated user-space instances, instead of only one instance. If a managed server 130 is a physical machine, then the managed server 130 is a computer or set of computers. If a managed server 130 is a virtual machine, then the managed server 130 executes on a computer or set of computers. The administrative domain-wide management policy 330 specifies whether and/or how entities associated with the administrative domain 150 are allowed to access (or be accessed by) other entities or otherwise consume (or provide) services. For example, the administrative domain-wide management policy 330 specifies security or resource usage. A security policy might specify access control, secure connectivity, disk encryption, and/or control of executable processes, while a resource-usage policy might specify usage of the administrative domain's computing resources (e.g., disks, peripherals, and/or bandwidth).

A managed server 130 includes a management module 132, a management module configuration 134, and a policy implementation module 136. The management module 132 implements the administrative domain-wide management policy 330. For example, in the case of security, the management module 132 can be a low-level network or security engine such as an operating system-level firewall, an Internet Protocol security (IPsec) engine, or a network traffic filtering engine (e.g., based on the Windows Filtering Platform (WFP) development platform). In the case of resource usage, the management module 132 can be a disk-usage engine or a peripheral-usage engine.

The management module configuration 134 affects the operation of the management module 132. For example, in the case of security, the management module configuration 134 can be access control rules applied by a firewall, secure connectivity policies applied by an IPsec engine (e.g., embodied as iptables entries and ipset entries in the Linux operating system), or filtering rules applied by a filtering engine. In the case of resource usage, the management module configuration 134 can be disk-usage policies applied by a disk-usage engine or peripheral-usage policies applied by a peripheral-usage engine.

The policy implementation module 136 generates the management module configuration 134 based on a) management instructions received from the global manager 120 and b) the state of the managed server 130. The management instructions are generated based, in part, on the administrative domain-wide management policy 330. The management module configuration 134 generated by the policy implementation module 136 implements that administrative domain-wide management policy 330 (to the extent that the policy concerns the managed server 130). This two-step process (generating management instructions and generating the management module configuration 134) is referred to as "instantiating" a management policy. The policy implementation module 136 also monitors the local state of the managed server 130 and sends local state information to the global manager 120.

In one embodiment, the policy implementation module 136 is part of a larger proprietary module (not shown). The proprietary module is loaded onto a device that already has a management module 132 and a management module configuration 134, thereby transforming the device from an unmanaged device 140 to a managed server 130. The policy implementation module 136 is further described below with reference to FIGS. 4, 6, and 7.

An unmanaged device 140 is a computer (or set of computers) that does not include a policy implementation module 136. An unmanaged device 140 does not implement the administrative domain-wide management policy 330. However, interaction between a managed server 130 and an unmanaged device 140 can be subject to the administrative domain-wide management policy 330 (as implemented by the managed server 130). One example of an unmanaged device 140 is a network circuit that is used by an administrative domain 150. Another example of an unmanaged device 140 is a device used by a person to authenticate himself to the administrative domain 150 (e.g., a notebook or desktop computer, a tablet computer, or a mobile phone).

The global manager 120 is a computer (or set of computers) that generates management instructions for managed servers 130 and sends the generated management instructions to the servers. The management instructions are generated based on a) the state of the administrative domain's computer network infrastructure 320 and b) an administrative domain-wide management policy 330. The state of the administrative domain's computer network infrastructure 320 includes descriptions of managed servers 130 and (optionally) descriptions of unmanaged devices 140. The global manager 120 also processes local state information received from managed servers 130.

The administrative domain-wide management policy 330 is based on a logical management model that can reference managed servers 130 based on their high-level characteristics, referred to herein as "labels." A label is a pair that includes a "dimension" (a high-level characteristic) and a "value" (the value of that high-level characteristic). A management policy constructed in this multi-dimensional space is more expressive than a management policy constructed according to a single-characteristic network/IP address-based policy model. In particular, expressing management policy using the higher-level abstractions of "labels" enables people to better understand, visualize, and modify management policy.

The logical management model (e.g., the number and types of dimensions available and those dimensions' possible values) is configurable. In one embodiment, the logical management model includes the following dimensions and values, as shown in Table 1:

TABLE 1

Example of logical management model

| Dimension | Meaning (M), Values (V) |
| --- | --- |
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |

The logical management model enables multiple managed servers 130 to be grouped together by specifying one or more labels (referred to herein as a "label set") that describe all of the managed servers 130 in the group. A label set includes either zero values or one value for a dimension in the logical management model. A label set need not include labels for all dimensions in the logical management model. In this way, the logical management model enables the segmentation and separation of an administrative domain's managed servers 130 and the creation of arbitrary groupings of managed servers 130. The logical management model also allows for a single managed server 130 to exist in multiple overlapping sets (i.e., multiple overlapping groups of managed servers). The logical management model does not limit the single managed server 130 to existing in a hierarchy of nested sets.

For example, in the case of security, segmentation can be used with access control policies to define groups of managed servers 130 that are subject to particular policies. Similarly, segmentation can be used with secure connectivity policies to define groups of managed servers 130 and the policies that apply to intra-group communications and inter-group communications. So, communications among a first group of managed servers 130 (specified by a first label set) can be restricted to a first secure connection setting (e.g., secure connection not required), and communications between the first group of managed servers and a second group of managed servers (specified by a second label set) can be restricted to a second secure connection setting (e.g., IPsec Encapsulating Security Payload (ESP)/Authentication Header (AH) Advanced Encryption Standard (AES)/Secure Hash Algorithm-2 (SHA-2)).

Each managed server 130 in the environment 100 implements the administrative domain-wide management policy 330 (to the extent that the policy concerns the managed server 130). As a result, the administrative domain-wide management policy 330 is applied in a distributed fashion throughout the administrative domain 150, and there are no choke points. Also, the administrative domain-wide management policy 330 is applied at the logical level independent of the administrative domain's physical network topology and network addressing schemes.

The global manager 120, the state of the administrative domain's computer network infrastructure 320, and the administrative domain-wide management policy 330 are further described below with reference to FIGS. 3, 5, and 8.

Figure 2:
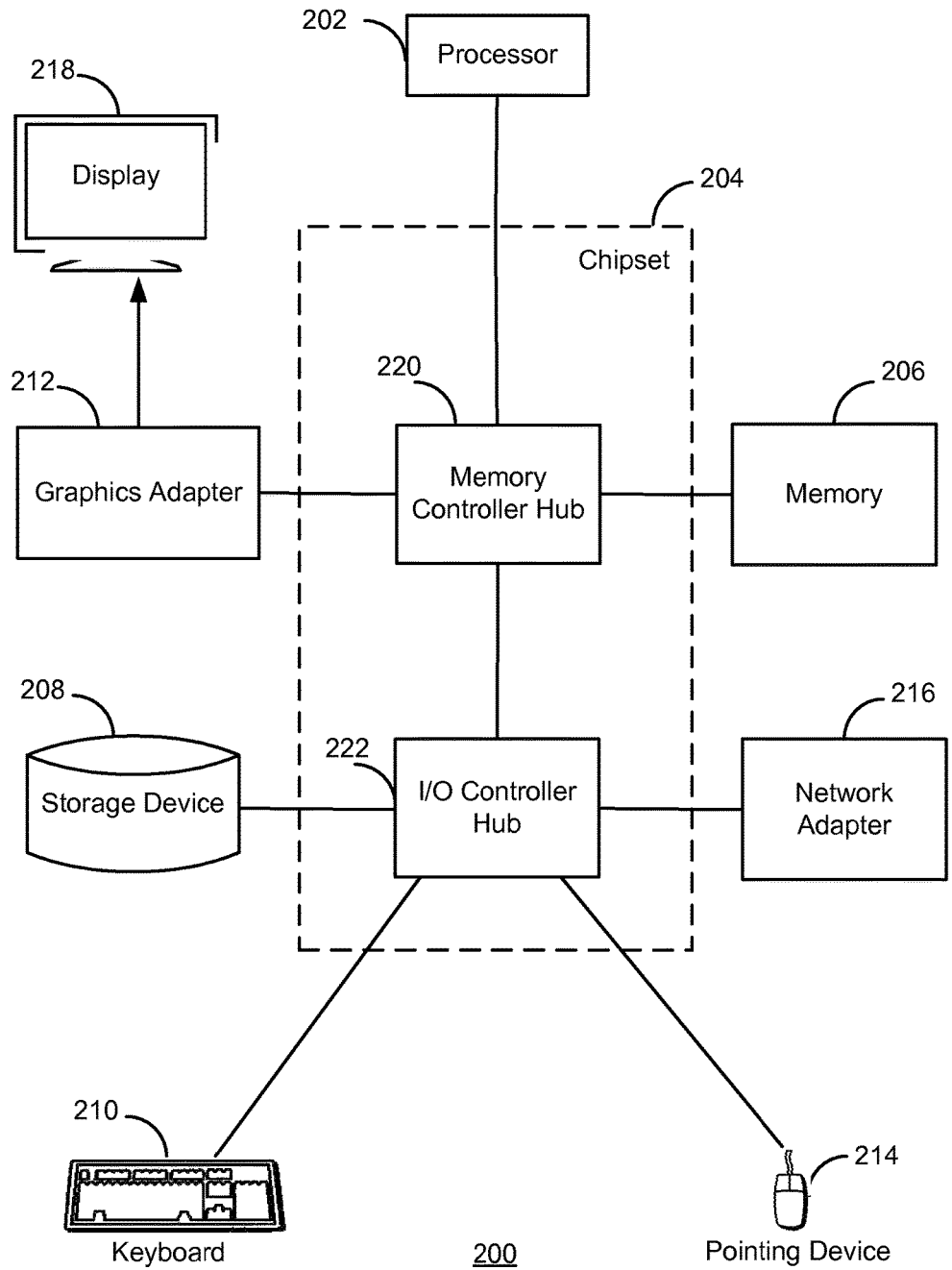
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the global manager 120 and/or the managed server 130 can be formed of multiple blade servers and lack a display device, keyboard, and other components, while the unmanaged device 140 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

FIG. 3 is a high-level block diagram illustrating a detailed view of a global manager 120, according to one embodiment. The global manager 120 includes a repository 300 and a processing server 310. The repository 300 is a computer (or set of computers) that stores the state of the administrative domain's computer network infrastructure 320, the administrative domain-wide management policy 330, and a global security data repository 335. In one embodiment, the repository 300 includes a server that provides the processing server 310 access to the administrative domain state 320, the management policy 330, and the global security data repository 335 in response to requests.

The state of the administrative domain's computer network infrastructure 320 includes descriptions of managed servers 130 and (optionally) descriptions of unmanaged devices 140. A description of a managed server 130 includes, for example, a unique identifier (UID), an online/offline indicator, one or more configured characteristics (optional), network exposure information, service information, and one or more labels that describe the managed server 130 (a label set).

The UID uniquely identifies the managed server 130. The online/offline indicator indicates whether the managed server 130 is online or offline. A "configured characteristic" stores a value associated with the managed server 130 and can be any type of information (e.g., an indication of which operating system is running on the managed server). A configured characteristic is used in conjunction with a rule's condition portion (described below).

The network exposure information concerns the managed server's network interfaces. In one embodiment, the network exposure information includes, for each of the managed server's network interfaces, an identifier of a "bidirectionally-reachable network" (BRN) to which the network interface is attached and zero or more IP addresses (and their subnets) that are used for operating within the BRN. A BRN is a set of subnets, within an organization or across organizations, where any node within the BRN can establish communication with any other node in the BRN. For example, all of the nodes in a BRN have unique IP addresses. In other words, a BRN does not contain any NATs. Network exposure information (e.g., a network interface's BRN identifier) can be used in conjunction with a rule's condition portion.

In another embodiment, the network exposure information includes routing information and/or whether the managed server is behind a network address translator (NAT) (and, if it is behind a NAT, what type of NAT—1:1 or 1:N). The global manager 120 can determine whether a managed server 130 is behind a network address translator (NAT) (and, if it is behind a NAT, what type of NAT—1:1 or 1:N). For example, the global manager 120 determines whether a NAT exists between the global manager 120 and the managed server 130 by comparing (a) the server's IP address according to the TCP connection between the global manager and the server and (b) the server's IP address according to the local state information received from the server. If (a) and (b) differ, then a NAT exists between the global manager 120 and the managed server 130. If a NAT does exist, then the global manager 120 determines the type of NAT (1:1 or 1:N) by performing data center detection. For example, the global manager 120 identifies the server's data center by the data center's public IP address. (Alternatively, the managed server performs data center detection by querying information that is external to the server but inside the data center. The server then sends that information to the global manager as part of the local status.) Configuration information indicates which types of NATs are used by which data centers. If no NAT information is associated with a particular data center, then the global manager 120 assumes that the NAT type is 1:N.

The service information includes, for example, process information and/or package information. Process information includes, for example, names of processes that the managed server 130 is running, which network ports and network interfaces those processes are listening on, which users initiated those processes, configurations of those processes, command-line launch arguments of those processes, and dependencies of those processes (e.g., shared objects to which those processes link). (Those processes correspond to the managed server 130 providing a service or using a service.) Package information includes, for example, which packages (executables, libraries, or other components) are installed on the managed server 130, the versions of those packages, the configurations of those packages, and the hash values of those packages.

A description of an unmanaged device 140 includes, for example, network exposure information (e.g., the IP address of the unmanaged device and an identifier of the BRN to which the unmanaged device is connected). An unmanaged device 140 is part of an "unmanaged device group" (UDG). An UDG includes one or more unmanaged devices 140. For example, the "Headquarters UDG" could include the primary circuit and the backup circuit that are used by an administrative domain's headquarters, where each circuit is associated with an IP address. An UDG is associated with a unique identifier (UID). Information stored in the administrative domain state 320 regarding an UDG includes the UID of the UDG and information regarding the unmanaged devices 140 in the UDG (e.g., their network exposure information).

Descriptions of managed servers 130 and unmanaged devices 140 can be loaded into the administrative domain state 320 in various ways, such as by interacting with the global manager 120 via a graphical user interface (GUI) or an application programming interface (API). Descriptions of managed servers 130 can also be loaded into the administrative domain state 320 based on local status information received from managed servers (described below).

Regarding managed servers' labels specifically (and configured characteristics, if any), the assignment (or reassignment) of a value for a dimension (or the setting of a configured characteristic's value) can be performed in even more ways. For example, the assignment/setting can be performed using a deployment and configuration tool as part of provisioning a managed server 130. Any such tool can be used, including off-the-shelf third-party tools (e.g., Puppet Labs' Puppet software, Opscode's Chef software, or CFEngine AS' CFEngine software) and custom tools that an administrative domain 150 might have.

As another example, the assignment/setting can be performed by a "label/configured characteristic engine" (not shown) that calculates labels and/or configured characteristic ("CC") values. In one embodiment, the label/CC engine calculates labels/CC values based on label/CC assignment rules. A label/CC assignment rule is a function that accesses data from the administrative domain state 320 and assigns (or suggests assignment of) a label or a CC value. A label/CC assignment rule can be preset or user-configurable. For example, the global manager 120 includes a set of predefined rules, but the end-user can modify and/or delete those rules and add new rules based on the user's own custom requirements. Label/CC assignment rules can be evaluated for a managed server 130 during the initialization process. Label/CC value suggestions can then be made for any dimension/CC, and the end-user can accept or reject those suggestions. For example, if a managed server 130 is executing the Postgres database or the MySQL database, then the suggested label could be <Role, Database>. If a managed server is executing the Linux operating system, then the suggested value for the operating system CC could be "Linux."

In another embodiment, the label/CC engine calculates labels/CC values based on cluster analysis. For example, the label/CC engine uses a combination of min-cut and K-means algorithms, with additional heuristics, of connected graphs to automatically identify a cluster of highly-connected managed servers 130. The cluster of managed servers 130 might correspond to an "application" (see Table 1) in the administrative domain 150. The end-user can choose to apply a value for the Application dimension (or any other dimension) to those managed servers 130 en masse.

The administrative domain-wide management policy 330 includes one or more rules. Broadly speaking, a "rule" specifies a relationship between one or more providers of a service and one or more consumers of that service.

Rule Function—The relationship is subjected to a "rule function", which is the practical effect of the rule. For example, in the case of security, the rule function could be access control, secure connectivity, disk encryption, or control of executable processes. A rule with an access control function specifies whether a consumer may use a provider's service. In one embodiment, the access control function uses a pure "whitelist" model, which means that only the allowable relationships are expressed, and all other relationships are blocked by default. A rule with a secure connectivity function specifies over what secure channels (e.g., encrypted network sessions using point-to-point data encryption) a consumer may use a provider's service. For example, a rule with a secure connectivity function could specify that usage of a provider's services must be encrypted when the provider is located in the US and the consumer is located in the EU. A rule with a disk encryption function specifies whether a provider must store its data on an encrypted file system. A rule with an executable process-control function specifies whether a process is allowed to execute.

In the case of resource usage, the rule function could be disk-usage or peripheral-usage. A rule with a disk-usage function specifies an amount of data that a consumer can store on a provider. Note that a rule can specify other rule functions as well beyond just access control, secure connectivity, disk encryption, control of executable processes, disk usage, and peripheral usage. For example, a rule function could specify which Open Systems Interconnection (OSI) model Layer-7 services to apply to network traffic, the amount of metadata to collect for security analytics, or the triggers for capturing a complete network packet. The management policy model supports any number of rule functions that can be applied.

A rule function can be associated with one or more settings (referred to herein as a "function profile") that specify details regarding the practical effect of the rule. For example, settings associated with a secure connectivity rule function can be a list of cryptographic algorithms used to encrypt network traffic. In one embodiment, a rule function is associated with multiple function profiles, and a function profile includes a priority. This priority is used by the function-level instruction generation module 360, as described below.

Service—In general, a "service" is an arbitrary process executing on a specific network port using a specific network protocol. A service of a rule within the management policy 330 is specified by a port/protocol pair and (optionally) additional qualifications, such as process information and/or package information (described above with respect to a description of a managed server 130 within the administrative domain state 320). If a managed server 130 has multiple network interfaces, then a service can be exposed on all networks or on only a subset of those networks. The end-user specifies on which networks the service is exposed. Note that, depending on the rule function, a service might not use any network resources. For example, a service for an executable process-control rule function does not execute on a network port using a network protocol.

Providers/Consumers—The one or more providers of the service and the one or more consumers (i.e., users) of the service are managed servers 130 and/or unmanaged devices 140.

In one embodiment, a rule is represented within the administrative domain-wide management policy 330 using a set of information that includes a rule function portion, a service portion, a provided-by portion, a used-by portion, and an optional rule condition portion. The rule function portion describes the practical effect of the rule and can be associated with one or more settings (function profiles). The service portion describes the service to which the rule applies. If the service portion indicates "All", then the rule applies to all services.

The provided-by (PB) portion describes which managed servers 130 and/or unmanaged devices 140 can provide the service (i.e., who the "providers" are). If the PB portion indicates "Anybody", then anybody (e.g., any managed server 130 or unmanaged device 140) can provide the service. If the PB portion indicates "Any managed server", then any managed server 130 can provide the service. ("Any managed server" is equivalent to specifying a label set that contains a wildcard, thereby matching all managed servers 130.) The used-by (UB) portion describes which managed servers 130 and/or unmanaged devices 140 can use the service (i.e., who the "consumers" are). Similar to the PB portion, the UB portion can also indicate "Anybody" or "Any managed server."

Within the PB portion and the UB portion, a managed server 130 is specified by using a label set (i.e., one or more labels that describe the managed server) or a UID. The ability to specify managed servers 130 using label sets stems from the logical management model, which references managed servers based on their dimensions and values (labels). An unmanaged device 140 is specified by using a UID of an unmanaged device group (UDG). If a rule specifies an UDG, then the rule includes additional information regarding the unmanaged devices 140 in that group (e.g., the devices' network exposure information). The PB portion of a rule and/or the UB portion of a rule can include multiple items, including label sets (to specify managed servers 130), managed server UIDs, and/or UDG UIDs.

The rule condition portion, which is optional, specifies whether the rule applies to a particular managed server 130 and/or a particular network interface of that managed server. The rule condition portion is a Boolean expression that includes one or more configured characteristics ("CCs"; part of a managed server's description in the administrative domain state 320) and/or network exposure information (e.g., a network interface's BRN identifier; also part of a managed server's description in the administrative domain state 320). A CC portion of the expression specifies whether the rule applies to the particular managed server, while a network exposure information portion of the expression specifies whether the rule applies to a particular network interface of that managed server. If the expression evaluates to "true" for a particular managed server's configured characteristics (specifically, for the values of that managed server's configured characteristics) and a particular network interface's information, then the rule applies to that managed server and that managed server's relevant network interface. If the expression evaluates to "false", then the rule does not apply to that managed server and that managed server's relevant network interface. For example, if a configured characteristic stores an indication of which operating system is running on the managed server, then a rule condition portion that includes that configured characteristic can control whether the rule applies to a particular managed server based on that server's operating system.

Rules within the administrative domain-wide management policy 330 are organized into rule lists. Specifically, the management policy 330 includes one or more rule lists, and a rule list includes one or more rules and (optionally) one or more scopes. A "scope" constrains where (i.e., to which managed servers 130) a rule is applied. A scope includes a provided-by (PB) portion and a used-by (UB) portion that limit the application of the rules in the rule list. The PB portion of the scope limits the PB portion of the rules, and the UB portion of the scope limits the UB portion of the rules. The PB and UB portions of a scope can specify a group of managed servers 130 by using a label set. If the label set does not contain a label for a specific dimension, then there is no scoping of that dimension for the resulting group of managed servers 130. If a rule list does not include any scopes, then its rules are applied globally.

Different scopes can be applied to a single rule list. For example, an end-user can build a set of rules that express how the web service tier (managed servers 130 with a <Role, Web> label) consumes services from the database tier (managed servers with a <Role, Database> label), how the load-balancing tier consumes services from the web service tier, and so on. Then, if the end-user wants to apply this rule list to his production environment (managed servers 130 with an <Environment, Production> label) and to his staging environment (managed servers with an <Environment, Staging> label), he does not need to copy or duplicate the rule list. Instead, he applies multiple scopes to a single rule list (a first scope where the PB portion and the UB portion include the <Environment, Production> label and a second scope where the PB portion and the UB portion include the <Environment, Staging> label). The scope abstraction makes the rule list scale from both a usability perspective and a computational perspective.

Now that the administrative domain-wide management policy 330 has been described, it is helpful to work through some examples. Consider an administrative domain 150 with a two-tier application where a user device accesses a web server (the first tier), and the web server accesses a database server (the second tier). In the first tier, the user device is the consumer, and the web server is the provider. In the second tier, the web server is the consumer, and the database server is the provider. The administrative domain 150 includes two instances of this application: one in a production environment and one in a staging environment.

The web servers and the database servers are managed servers 130, and their descriptions (e.g., label sets) are present in the administrative domain state 320. For example, their label sets are:
web server in production: <Role, Web> and <Environment, Production>
database server in production: <Role, Database> and <Environment, Production>
web server in staging: <Role, Web> and <Environment, Staging>
database server in staging: <Role, Database> and <Environment, Staging>
(The Application dimension, the Line of Business dimension, and the Location dimension are not relevant to this example, so their labels are omitted.)

Now consider the following administrative domain-wide management policy 330, which is a security policy that specifies access control and secure connectivity:
Rule List #1
  Scopes
    <Environment, Production>
    <Environment, Staging>
  Rules
    #1
      Function: Access Control
      Service: Apache
      PB: <Role, Web>
      UB: Anybody
    #2
      Function: Access Control
      Service: PostgreSQL
      PB: <Role, Database>
      UB: <Role, Web>
Rule List #2
  Scopes: None
  Rules
    #1
      Function: Secure Connectivity
      Service: All
      PB: <Role, Database>
      UB: Any managed server Note that the rules above refer to services simply as "Apache" and "PostgreSQL" for clarity. Remember that a service is a process and is specified by a port/protocol pair and (optionally) additional qualifications, such as process information and/or package information (described above with respect to a description of a managed server 130 within the administrative domain state 320).

Rule List #1/Rule #1 allows any device (e.g., a user device) to connect to a web server and use the Apache service. Specifically, the allowance of a connection is specified by "Access Control" in the Function portion. The "any device" is specified by "Anybody" in the UB portion. The "web server" is specified by "<Role, Web>" (a label set that includes only one label) in the PB portion. The Apache service is specified by "Apache" in the Service portion.

Rule List #1/Rule #2 allows a web server to connect to PostgreSQL on a database server. Specifically, the allowance of a connection is specified by "Access Control" in the Function portion. The "web server" is specified by "<Role, Web>" in the UB portion. The "PostgreSQL" is specified by "PostgreSQL" in the Service portion. The "database server" is specified by "<Role, Database>" (a label set that includes only one label) in the PB portion.

Rule List #1 also prevents inter-environment connections. For example, a web server is allowed to connect to PostgreSQL on a database server if the web server and database server are both in the same environment (e.g., both in the production environment or both in the staging environment). Both servers in the production environment is specified by "<Environment, Production>" (a label set that includes only one label) in the Scope portion, while both servers in the staging environment is specified by "<Environment, Staging>" (a label set that includes only one label) in the Scope portion. (Since the scopes in this example do not distinguish between the PB portion and the UB portion, each scope's label set is applied to both the PB portion and the UB portion.) As a result, a web server is not allowed to connect to PostgreSQL on a database server if the servers are in different environments (e.g., if the web server is in the staging environment and the database server is in the production environment).

Rule List #2 states that whenever any managed server connects to a database server, that connection must be performed through an encrypted channel. Specifically, the "database server" is specified by "<Role, Database>" in the PB portion. The "encrypted channel" is specified by "Secure Connectivity" in the Function portion. The "any managed server" is specified by "Any managed server" in the UB portion. The "whenever" is specified by "All" in the Service portion.

Turning aside from the above example, consider the following two managed servers 130: Server 1 is a web server that is part of production, part of app1, and owned by engineering in California. It would be labeled as:
<Role, Web>
<Environment, Production>
<Application, app1>
<LB, Engineering>
<Location, US>

Server 2 is a database server that is part of production, also part of app1, and also owned by engineering but in Germany. It would be labeled as:
<Role, Database Server>
<Environment, Production>
<Application, app1>
<LB, Engineering>
<Location, EU>

Assume that an access control rule allows all access to all managed servers 130 that are part of app1. This rule would allow Server 1 and Server 2 to communicate with each other and would disallow a managed server 130 in Germany that is part of app2 from communicating with Server 1 or Server 2. Now assume that a secure connectivity rule specifies that all network traffic between EU and US must be encrypted. Rule functions are independently applied. In other words, the secure connectivity rule is a separate policy that is applied independent of the access control rule. As a result, the network traffic from Server 1 to Server 2 would be allowed (given the access control rule) and encrypted (given the secure connectivity rule).

Returning to FIG. 3, the global security data repository 335 is described below in the section entitled "Additional Security Aspects."

The processing server 310 generates management instructions for managed servers 130 and sends the generated management instructions to the servers. The processing server 310 also processes local state information received from managed servers 130. The processing server 310 includes various modules such as a policy engine module 340, a relevant rules module 350, a function-level instruction generation module 360, an actor enumeration module 370, a relevant actors module 380, an administrative domain state update module 385, and a global security module 390.

In one embodiment, the processing server 310 includes a computer (or set of computers) that communicates with the repository 300 and processes data (e.g., by executing the policy engine module 340, the relevant rules module 350, the function-level instruction generation module 360, the actor enumeration module 370, the relevant actors module 380, the administrative domain state update module 385, and the global security module 390).

The relevant rules module 350 takes as input the administrative domain-wide management policy 330 and an indication of a particular managed server 130 (e.g., that server's UID), generates a set of rules that are relevant to that server, and outputs the set of rules. This is a filtering process by which the relevant rules module 350 examines the management policy 330 and extracts only the relevant rules for the given managed server 130. The relevant rules module 350 performs the filtering by iterating through all of the rule lists in the management policy 330, analyzing the scopes of each rule list to determine whether the scopes apply to this managed server 130 and (if the scopes do apply to this managed server 130) analyzing the rules of each rule list to determine whether those rules apply to this managed server 130. A rule applies to a managed server 130 if a) the PB portion of the rule and/or the UB portion of the rule specifies the managed server and b) the condition portion of the rule (if present) evaluates to "true" for that managed server (specifically, for the values of that managed server's configured characteristics and network exposure information). The end result (referred to herein as a "management policy perspective") is a collection of two sets of rules: rules where this managed server 130 provides a service and rules where this managed server 130 consumes a service.

The function-level instruction generation module 360 takes as input a set of rules (e.g., a management policy perspective generated by the relevant rules module 350), generates function-level instructions, and outputs the function-level instructions. The function-level instructions are later sent to a managed server 130 as part of the management instructions. A function-level instruction is similar to a rule in that each one includes a rule function portion, a service portion, a PB portion, and a UB portion. However, whereas a rule can include multiple items within its PB portion and/or UB portion (including label sets, managed server UIDs, and/or UDG UIDs), a function-level instruction includes only one item within its PB portion and only one item within its UB portion. Also, whereas a rule can specify a managed server (including its multiple network interfaces) within its PB portion and/or UB portion, a function-level instruction includes only one network interface within its PB portion and UB portion.

The function-level instruction generation module 360 analyzes a rule and generates one or more function-level instructions based on that rule. If the rule's PB portion includes multiple items, the rule's UB portion includes multiple items, or a managed server referenced by the rule (in the PB portion or UB portion) has multiple network interfaces, then the function-level instruction generation module 360 generates multiple function-level instructions (e.g., one function-level instruction for each possible combination of a PB item, a UB item, and a particular network interface).

Consider a rule that includes two items in its PB portion (A and B) and two items in its UB portion (C and D). The function-level instruction generation module 360 would generate four function-level instructions with the following PB and UB portions: 1) PB=A, UB=C; 2) PB=A, UB=D; 3) PB=B, UB=C; 4) PB=B, UB=D. Now consider a rule that covers a managed server in its PB portion or UB portion (e.g., by specifying a UID or a label set), and that managed server has multiple network interfaces. The function-level instruction generation module 360 would generate multiple function-level instructions (e.g., one function-level instruction for each network interface of the managed server).

The function-level instruction generation module 360 analyzes the rules, the functions within those rules, and the function profiles referenced by those rules. If a rule list includes multiple scopes, then the function-level instruction generation module 360 applies those scopes multiple times to the rule list iteratively (thereby generating a complete set of function-level instructions for each scope). Recall that a rule function can be associated with multiple function profiles, and a function profile can include a priority. The function-level instruction generation module 360 orders the rules based on the priorities of the various function profiles such that the function profile with the highest priority is used. The function-level instruction generation module 360 translates the ordered rules into function-level instructions for the managed server 130 to execute. Function-level instructions reference the appropriate managed servers 130 and/or unmanaged devices 140 (e.g., the managed servers 130 and/or unmanaged devices 140 that were referenced in the input rules), taking into account the network exposure details of the services associated with the rules.

Note that the function-level instruction generation module 360 can generate a function-level instruction for a particular managed server 130 that turns out to be irrelevant for that server. For example, that managed server is covered by the provided-by (PB) portion of a rule, so the function-level instruction generation module 360 generates a corresponding function-level instruction. However, the rule also includes a portion that specifies the managed server's local state (e.g., a service portion that describes the provided service). Since the global manager 120 does not know the managed server's local state (e.g., whether the managed server is actually providing that service), the generated function-level instruction is sent to the managed server. The managed server checks its local state (e.g., whether it is providing that service) and processes the function-level instruction accordingly, as explained below with reference to the policy compilation module 410.

The actor enumeration module 370 takes as input a collection of descriptions of managed servers 130 and unmanaged device groups (UDGs) (e.g., the state of the administrative domain's computer network infrastructure 320), generates representations of those descriptions of servers and UDGs in an enumerated form (referred to as "actor-sets"), and outputs the actor-sets. For example, the actor enumeration module 370 enumerates the managed servers 130 and the UDGs within the administrative domain state 320 and the possible label sets and assigns each a unique identifier (UID). These actor-sets can then be used in conjunction with UB portions and PB portions of rules and scopes, which specify actors using managed server UIDs, UDG UIDs, and/or label sets.

Consider a logical management model that includes a set of N dimensions $D_i$ (i=1, ..., N), and each dimension $D_i$ includes a set $S_i$ of possible values $V_j$ (j=1, ..., $M_i$) (where the wildcard "*" is one of the possible values). In one embodiment, the actor enumeration module 370 enumerates all label sets that are possible based on the logical management model, which are equal to the Cartesian product given by $S_1 \times S_2 \times \ldots \times S_N$. The size of this set is $M_1 \times M_2 \times \ldots \times M_N$. The enumeration process collapses the multi-dimensional label space of the managed servers 130 into a simple enumerated form.

In another embodiment, the actor enumeration module 370 enumerates only those label sets that are possible based on the administrative domain state 320 (e.g., based on descriptions of managed servers within the administrative domain 150). For example, consider a logical management model that includes 2 dimensions (X and Y), and each dimension includes 3 possible values (A, B, and *). A managed server with the label set "<X=A>,<Y=B>" can be a member of 4 possible label sets: 1) "<X=A>,<Y=B>", 2) "<X=A>,<Y=*>", 3) "<X=*>,<Y=B>", and 4) "<X=*>,<Y=*>". Note that the managed server's label set exists in 2-dimensional space (X and Y), while possible label sets 2, 3, and 4 are projections of the managed server's label set into sub-dimensional spaces (label set 2 is 1-dimensional space (X), label set 3 is 1-dimensional space (Y), and label set 4 is 0-dimensional space). So, the actor enumeration module 370 enumerates those 4 possible label sets. The managed server with the label set "<X=A>,<Y=B>" cannot be a member of the label set "<X=A>,<Y=A>", so the actor enumeration module 370 does not enumerate that label set.

In yet another embodiment, the actor enumeration module 370 enumerates only those label sets that are used in the administrative domain-wide management policy 330 (e.g., in UB portions and PB portions of rules and scopes).

An actor-set includes a UID and zero or more actor-set records. An actor-set record includes a UID (either a managed server UID or an UDG UID), an identifier of the actor's operating system, and the IP address of the actor (managed server 130 or unmanaged device 140) given the specific BRN. For example, an actor-set might include actor-set records whose IP addresses correspond to all of the managed servers 130 covered by the label set of <Role, Database> and <Environment, Production>. As another example, an actor-set might include actor-set records whose IP addresses correspond to all of the unmanaged devices 140 in the Headquarters UDG. A single actor (e.g., managed server 130 or unmanaged device 140) can appear in multiple actor-sets.

Another factor in the actor-set calculation is actors with multiple network interfaces, plus the inclusion of network topology such as network address translation (NAT). So, there could be two actor-sets for the label set of <Role, Database> and <Environment, Production>: one actor-set with the internet-facing IP addresses of those managed servers 130 (i.e., associated with a first BRN), and a different actor-set for those same managed servers with the private network-facing IP addresses of those managed servers (i.e., associated with a second BRN).

In one embodiment, the actor enumeration module 370 can also update actor-sets based on changes to the administrative domain state 320. For example, the actor enumeration module 370 takes as input actor-sets (previously output by the actor enumeration module) and a change to a managed server's description (within the administrative domain state 320), generates updated actor-sets (which are consistent with the changed server description), and outputs the updated actor-sets. The actor enumeration module 370 generates the updated actor-sets in different ways depending on the type of change to the managed server's description.

Offline/online change—If the description change indicates that the server went from online to offline, then the actor enumeration module 370 generates the updated actor-sets by removing the server's actor-set record from all input actor-sets of which the server was a member. If the description change indicates that the server went from offline to online, then the actor enumeration module 370 generates the updated actor-sets by adding the server's actor-set record to any relevant input actor-sets. (If necessary, the actor enumeration module 370 creates a new actor-set and adds the server's actor-set record to that new actor-set.)

Label set change—If the description change indicates that the server's label set changed, then the actor enumeration module 370 treats this like a first server (with the old label set) going offline and a second server (with the new label set) coming online.

Network exposure information change—If the description change indicates that the server removed a network interface, then the actor enumeration module 370 generates the updated actor-sets by removing the server's actor-set record from all input actor-sets (associated with that network interface's BRN) of which the server was a member. If the description change indicates that the server added a network interface, then the actor enumeration module 370 generates the updated actor-sets by adding the server's actor-set record to any relevant input actor-sets (associated with that network interface's BRN). (If necessary, the actor enumeration module 370 creates a new actor-set (associated with that network interface's BRN) and adds the server's actor-set record to that new actor-set.) If the description change indicates that the server changed a network interface's BRN, then the actor enumeration module 370 treats this like a first network interface (with the old BRN) being removed and a second network interface (with the new BRN) being added. If the description change indicates that the server changed a network interface's IP address (but not the BRN), then the actor enumeration module 370 generates the updated actor-sets by modifying the server's actor-set record in all input actor-sets (associated with that network interface's BRN) of which the server was a member.

The relevant actors module 380 takes as input one or more actor-sets (e.g., the managed servers 130 and the UDGs within the administrative domain state 320 in enumerated form) and a set of rules (e.g., a management policy perspective), determines which actor-sets are relevant to those rules, and outputs only those actor-sets. This is a filtering process by which the relevant actors module 380 examines the actor-sets and extracts only the relevant actor-sets for the given set of rules. The relevant actors module 380 performs the filtering by iterating through all of the input actor-sets, analyzing the PB portions and UB portions of the input rules to determine whether a particular actor-set is referenced by any of the rules' PB portions or UB portions. The end result (referred to herein as an "actor perspective") is a collection of actor-sets. The actor perspective is later sent to a managed server 130 as part of the management instructions.

In one embodiment, the relevant actors module 380 uses the input set of rules to generate an "actor-set filter." The actor-set filter selects, from the input actor-sets, only the actor-sets that are relevant to the input rules. In other words, the relevant actors module 380 uses the actor-set filter to filter the input actor-sets into relevant actor-sets.

The policy engine module 340 generates management instructions for managed servers 130 and sends the generated management instructions to the servers. The policy engine module 340 generates the management instructions (using the relevant rules module 350, the function-level instruction generation module 360, the actor enumeration module 370, and the relevant actors module 380) based on a) the state of the administrative domain's computer network infrastructure 320 and b) the administrative domain-wide management policy 330.

For example, the policy engine module 340 executes the relevant rules module 350, providing as input the administrative domain-wide management policy 330 and the UID of a particular managed server 130. The relevant rules module 350 outputs a set of rules that are relevant to that server (a "management policy perspective"). The policy engine module 340 executes the actor enumeration module 370, providing as input the administrative domain state 320. The actor enumeration module 370 outputs a representation of the descriptions of the managed servers 130 and unmanaged device groups (UDGs) within the administrative domain state 320 in an enumerated form ("actor-sets"). The policy engine module 340 executes the function-level instruction generation module 360, providing as input the management policy perspective (output by the relevant rules module 350). The function-level instruction generation module 360 outputs function-level instructions. The policy engine module 340 executes the relevant actors module 380, providing as input the actor-sets (output by the enumeration module 370) and the management policy perspective (output by the relevant rules module 350). The relevant actors module 380 outputs only those actor-sets that are relevant to those rules ("relevant actor-sets"). The policy engine module 340 sends the function-level instructions (output by the function-level instruction generation module 360) and the relevant actor-sets (output by the relevant actors module 380) to the particular managed server 130.

In one embodiment, the policy engine module 340 caches information that was generated during the above process. For example, the policy engine module 340 caches, in association with the particular managed server 130, the management policy perspective, the function-level instructions, the actor-set filter, and/or the relevant actor-sets. As another example, the policy engine module 340 caches the administrative domain's actor-sets (which are not specific to a particular managed server 130).

Since an administrative domain's actor-sets are based on the administrative domain state 320, a change to the administrative domain state 320 can require a change to the administrative domain's actor-sets. Similarly, since a managed server's management instructions are based on the administrative domain state 320 and the administrative domain-wide management policy 330, a change to the administrative domain state 320 and/or a change to the administrative domain-wide management policy 330 can require a change to the managed server's management instructions. In one embodiment, the policy engine module 340 can update an administrative domain's actor-sets and/or update a managed server's management instructions and then distribute these changes (if necessary) to managed servers 130. The cached information mentioned above helps the policy engine module 340 more efficiently update the administrative domain's actor-sets and/or the managed server's management instructions and distribute the changes.

In one embodiment, the policy engine module 340 updates an administrative domain's actor-sets (based on a change to the administrative domain state 320) and distributes the changes to managed servers 130 as follows: The policy engine module 340 executes the actor enumeration module 370, providing as input the cached actor-sets (previously output by the actor enumeration module) and the changed portion of the administrative domain state 320 (e.g., a changed server description). The actor enumeration module 370 outputs the updated actor-sets. In one embodiment, the policy engine module 340 then sends all of the updated actor-sets to all of the managed servers 130 within the administrative domain 150. However, that embodiment is inefficient, since not all managed servers are affected by changes to all actor-sets.

In another embodiment, only selected actor-sets are sent to selected servers. For example, a particular managed server is sent only those actor-sets that a) were previously sent to that server and b) have changed. The cached relevant actor-sets indicate which actor-sets were previously sent to that server (see (a) above). The policy engine module 340 compares the cached actor-sets to the updated actor-sets to determine which actor-sets have changed (see (b) above). The policy engine module 340 then computes the intersection of (a) and (b). Actor-sets in that intersection are sent to the particular managed server. In one embodiment, for even greater efficiency, actor-sets are sent in "diff" format, which describes differences between the cached actor-sets and the updated actor-sets. For example, the diff format specifies an actor-set identifier, an actor identifier (e.g., a managed server UID or an UDG UID), and an indication of whether that actor should be added to, removed from, or modified within the actor-set.

In yet another embodiment, two tables are maintained and used to improve efficiency. A first table associates a managed server 130 with actor-sets of which that managed server is a member. A second table associates a managed server 130 with actor-sets that are relevant to that managed server (e.g., as determined by the relevant actors module 380). In these tables, a managed server 130 is represented by, e.g., that managed server's UID, and an actor-set is represented by, e.g., that actor-set's UID. The policy engine module 340 uses the changed portion of the administrative domain state 320 (e.g., the changed server description) to determine which managed server's description changed. The policy engine module 340 uses the first table to determine which actor-sets that managed server was a member of. Those actor-sets might change as a result of the changed server description. So, the policy engine module 340 uses the second table to determine which managed servers those actor-sets are relevant to. The policy engine module 340 performs the intersection computation described above for only those managed servers.

In one embodiment, the policy engine module 340 updates a managed server's management instructions (based on a change to the administrative domain state 320) and sends the updated management instructions to the managed server as follows: The policy engine module 340 executes the relevant rules module 350, providing as input the administrative domain-wide management policy 330 and the UID of the managed server 130. The relevant rules module 350 outputs a set of rules that are relevant to that server (a "management policy perspective"). The policy engine module 340 compares the management policy perspective that was just output to the cached management policy perspective to determine whether they differ. If the just-output management policy perspective and the cached management policy perspective are identical, then the policy engine module 340 takes no further action. In this situation, the previously-generated managed server's management instructions (specifically, the function-level instructions and relevant actor-sets) are consistent with the change to the administrative domain state 320 and do not need to be re-generated and re-sent to the managed server.

If the just-output management policy perspective and the cached management policy perspective differ, then the policy engine module 340 determines which rules should be added to the cached perspective and which rules should be removed from the cached perspective. The policy engine module 340 executes the function-level instruction generation module 360, providing as input the rules to add and the rules to remove. The function-level instruction generation module 360 outputs function-level instructions to add and function-level instructions to remove (relative to the cached function-level instructions, which were previously sent to the managed server). The policy engine module 340 instructs the managed server to add or remove the various function-level instructions, as appropriate. In one embodiment, for greater efficiency, function-level instructions are sent in "diff" format, which describes differences between the cached function-level instructions and the updated function-level instructions. For example, the diff format specifies a function-level instruction identifier and an indication of whether that function-level instruction should be added to or removed from the previously-sent function-level instructions.

The policy engine module 340 also executes the actor enumeration module 370, providing as input the cached actor-sets and the changed portion of the administrative domain state 320 (e.g., the changed server description). The actor enumeration module 370 outputs the updated actor-sets. The policy engine module 340 executes the relevant actors module 380, providing as input the updated actor-sets and the just-output management policy perspective. The relevant actors module 380 outputs only those updated actor-sets that are relevant to those rules ("updated relevant actor-sets").

The policy engine module 340 compares the updated relevant actor-sets to the cached relevant actor-sets to determine whether they differ. If the updated relevant actor-sets and the cached relevant actor-sets are identical, then the policy engine module 340 sends no actor-sets to the managed server. In this situation, the previously-generated relevant actor-sets are consistent with the change to the administrative domain state 320 and do not need to be re-sent to the managed server. If the updated relevant actor-sets and the cached relevant actor-sets differ, then the policy engine module 340 determines which actor-sets should be added, removed, or modified relative to the cached relevant actor-sets. The policy engine module 340 instructs the managed server to add, remove, or modify the various actor-sets, as appropriate. In one embodiment, for greater efficiency, actor-sets are sent in "diff" format, which describes differences between the cached relevant actor-sets and the updated relevant actor-sets. For example, the diff format specifies an actor-set identifier and an indication of whether that actor-set should be added to, removed from, or modified relative to the previously-sent actor-sets.

Recall that the policy engine module 340 can update a managed server's management instructions (based on a change to the administrative domain-wide management policy 330) and send the updated management instructions to the managed server. A change to the management policy 330 is, for example, the addition, removal, or modification of a rule or a rule set. In one embodiment, a change to the management policy 330 is generated by interaction with the global manager 120 via a GUI or API. In another embodiment, a change to the management policy 330 is generated by an automated process within the global manager 120 (e.g., in response to a security threat detected by the global manager). The policy engine module 340 updates the managed server's management instructions and sends the updated management instructions to the managed server in a similar way, regardless of whether there was a change to the management policy 330 or a change to the administrative domain state 320. However, there are a few differences.

In the case of a change to the management policy 330, the policy engine module 340 does not necessarily update management instructions for all managed servers 130. Instead, the policy engine module 340 compares the previous management policy 330 to the new management policy 330 to determine which rules should be added, removed, or modified relative to the previous management policy 330. The policy engine module 340 determines which managed servers 130 are affected by the changed rules (e.g., which managed servers are covered by a) the rules' and/or scopes' PB and/or UB portions and b) the rules' conditional portions (if any)). The policy engine module 340 executes the relevant rules module 350, providing as input the changed rules (instead of the entire new management policy 330) and the UID of the managed server 130 (for only those servers that are affected by the changed rules).

The administrative domain state update (ADSU) module 385 receives changes to the administrative domain state 320 and processes those changes. A change to the administrative domain state 320 is, for example, the addition, removal, or modification of a description of a managed server 130 (including the modification of a managed server's label set or configured characteristics) or a description of an unmanaged device or unmanaged device group. In one embodiment, a change to the administrative domain state 320 originates in local state information received from a particular managed server 130. In another embodiment, a change to the administrative domain state 320 is generated by interaction with the global manager 120 via a GUI or API. In yet another embodiment, a change to the administrative domain state 320 is generated by an automated process within the global manager 120 (e.g., in response to a security threat detected by the global manager).

For example, the ADSU module 385 receives a change regarding a particular unmanaged device 140. The ADSU module 385 stores the new information in the administrative domain state 320 (e.g., as part of an unmanaged device group of which that particular unmanaged device is a member). The ADSU module 385 then updates the administrative domain's actor-sets based on the unmanaged device group change. Specifically, the ADSU module 385 instructs the policy engine module 340 to update the administrative domain's actor-sets. In one embodiment, the ADSU module 385 waits for an event to occur before instructing the policy engine module 340 to update the administrative domain's actor-sets. This event can be, for example, receipt of a user command or occurrence of a specified maintenance window.

As another example, the ADSU module 385 receives a change regarding a particular managed server 130. The ADSU module 385 stores the new information in the administrative domain state 320 as part of the description of that particular managed server 130. The ADSU module 385 then (optionally) analyzes that managed server's description to determine additional information regarding the server and stores that information in the description. The ADSU module 385 then determines whether to update the administrative domain's actor-sets and/or the managed server's management instructions based on a change to the managed server's description. If the ADSU module 385 determines to update the administrative domain's actor-sets, then the ADSU module 385 instructs the policy engine module 340 to update the administrative domain's actor-sets. In one embodiment, the ADSU module 385 waits for an event to occur before instructing the policy engine module 340 to update the administrative domain's actor-sets. If the ADSU module 385 determines to update the managed server's management instructions, then the ADSU module 385 instructs the policy engine module 340 to update the managed server's management instructions. In one embodiment, the ADSU module 385 waits for an event to occur before instructing the policy engine module 340 to update the managed server's management instructions. The aforementioned events can be, for example, receipt of a user command or occurrence of a specified maintenance window.

Whether or not the ADSU module 385 determines to update the administrative domain's actor-sets and/or the managed server's management instructions depends on the type of change to the managed server's description. In one embodiment, the ADSU module 385 makes this determination as shown in Table 2:

TABLE 2

Whether to update administrative domain's actor-sets and/or managed server's management instructions based on type of server description change

| Type of Change | Whether to Update |
| --- | --- |
| Online to offline | Administrative domain's actor-sets: Yes<br>Managed server's management instructions: No |
| Offline to online | Administrative domain's actor-sets: Yes<br>Managed server's management instructions: Yes |
| Label set | Administrative domain's actor-sets: Yes<br>Managed server's management instructions: Yes |
| Configured characteristic | Administrative domain's actor-sets: Yes<br>Managed server's management instructions: Yes |
| Network exposure info | Administrative domain's actor-sets: Yes<br>Managed server's management instructions: Yes (unless IP address is the only change) |
| Service info | Administrative domain's actor-sets: No<br>Managed server's management instructions: Yes (only in specified situations) |

In one embodiment, the ADSU module 385 determines additional information regarding the server by executing the label/configured characteristic engine and providing the server's description as input. The label/CC engine calculates labels/CC values for the server based on the server's description and label/CC assignment rules. In another embodiment, the ADSU module 385 determines whether the server is behind a network address translator (NAT) (and, if it is behind a NAT, what type of NAT—1:1 or 1:N).

The global security module 390 is described below in the section entitled "Additional Security Aspects."

Figure 4:
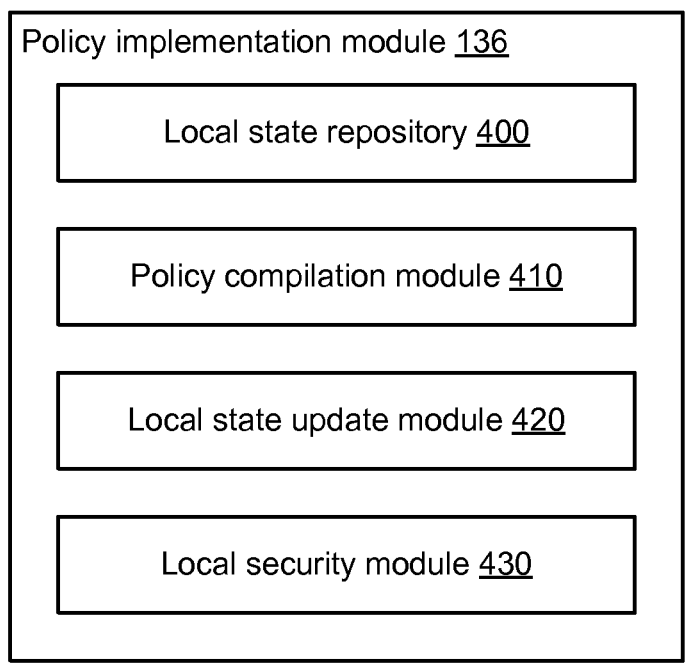
FIG. 4 is a high-level block diagram illustrating a detailed view of a policy implementation module of a managed server, according to one embodiment.

FIG. 4 is a high-level block diagram illustrating a detailed view of a policy implementation module 136 of a managed server 130, according to one embodiment. The policy implementation module 136 includes a local state repository 400, a policy compilation module 410, a local state update module 420, and a local security module 430. The local state repository 400 stores information regarding the local state of the managed server 130. In one embodiment, the local state repository 400 stores information regarding the managed server's operating system (OS), network exposure, and services. OS information includes, for example, an indication of which OS is running. Network exposure information and service information were described above with respect to a description of a managed server 130 within the administrative domain state 320.

The policy compilation module 410 takes as input management instructions and state of a managed server 130 and generates a management module configuration 134. For example, the management instructions are received from the global manager 120 and include function-level instructions (generated by the function-level instruction generation module 360) and relevant actor-sets (output by the relevant actors module 380). The state of the managed server 130 is retrieved from the local state repository 400. In one embodiment, execution of the policy compilation module 410 is triggered by a) the managed server powering up or coming online, b) the managed server receiving management instructions, and/or c) the contents of the local state repository 400 changing.

The policy compilation module 410 maps the function-level instructions and relevant actor-sets into a management module configuration 134. For example, the policy compilation module 410 maps an access control function-level instruction (which contains a port and an actor-set reference) into an iptables entry and an ipset entry in the Linux operating system or a Windows Filtering Platform (WFP) rule in the Windows operating system.

The application of management policy at a managed server 130 can be affected by the local state of that server. In one embodiment, the policy compilation module 410 evaluates a condition associated with a received function-level instruction and generates the management module configuration 134 based on the result of that evaluation. For example, the policy compilation module 410 evaluates a condition that references the operating system of the managed server's peer (i.e., the other actor in the relationship) and selects function profile attributes based on the result of that evaluation, where the selected function profile attributes are expressed in the management module configuration 134.

As another example, recall that a managed server 130 can receive a function-level instruction that turns out to be irrelevant for that server. For example, the rule includes a portion that specifies the managed server's local state (e.g., a service portion that describes the provided service). Since the global manager 120 does not know the managed server's local state (e.g., whether the managed server is actually providing that service), the generated function-level instruction is sent to the managed server. The policy compilation module 410 checks the managed server's local state (e.g., determines whether the managed server is providing that service). This determination amounts to evaluating a condition that references the managed server's local state. The policy compilation module 410 processes the function-level instruction accordingly. If the policy compilation module 410 determines that the condition evaluates to "true" (e.g., the managed server is providing that service), then the policy compilation module 410 incorporates that function-level instruction into the management module configuration 134. Specifically, the policy compilation module 410 incorporates function-level instructions into the management module configuration 134 only after evaluating the associated condition (which concerns the local state of that server). If the evaluation of the condition is false, then the policy compilation module 410 does not express the function-level instructions in the management module configuration 134. The specific conditions (e.g., their nature and particular values) are extensible. In one embodiment, the conditions are related to the definition of a "service" and include process information and/or package information (described above with respect to a description of a managed server 130 within the administrative domain state 320).

For example, consider a function-level instruction that allows access to only the Apache service inbound on port 80 (i.e., where the managed server 130 is the "provider" or endpoint). The managed server 130 expresses this function-level instruction in the management module configuration 134 to allow access on port 80 only after evaluating the associated condition, which concerns whether the application (executing on that server) that is listening on port 80 is actually Apache and not some other application (rogue or otherwise). The managed server 130 expresses this function-level instruction in the management module configuration 134 only after determining that the associated condition evaluates to "true." If the associated condition evaluates to "false," then the managed server 130 does not express this function-level instruction in the management module configuration 134. As a result, the network traffic is blocked.

In one embodiment, a managed server 130 monitors its outbound connections. The managed server 130 compares outbound network traffic to its internal process table to determine which processes in that table are establishing those outbound connections. The managed server 130 can enforce a rule that allows only certain processes (given a set of requirements, mentioned above as "process information") to establish an outbound connection.

In one embodiment (not shown), the policy compilation module 410 is located at the global manager 120 instead of at the managed server 130. In that embodiment, the global manager 120 does not send management instructions to the managed server 130. Instead, the managed server 130 sends its local state to the global manager 120. After the policy compilation module 410 generates the management module configuration 134 (at the global manager 120), the management module configuration 134 is sent from the global manager 120 to the managed server 130.

The local state update (LSU) module 420 monitors the local state of the managed server 130 and sends local state information to the global manager 120. In one embodiment, the LSU module 420 determines an initial local state of the managed server 130, stores appropriate local state information in the local state repository 400, and sends that local state information to the global manager 120. The LSU module 420 determines the local state of the managed server 130 by inspecting various parts of the server's operating system (OS) and/or file system. For example, the LSU module 420 obtains service information from the OS' kernel tables (networking information), the OS' system tables (package information), and the file system (files and hash values). The LSU module 420 obtains network exposure information from the OS' kernel and/or OS-level data structures.

After the LSU module 420 sends the initial local state information to the global manager 120, the LSU module monitors changes to the local state. The LSU module monitors changes by, for example, polling (e.g., performing inspections periodically) or listening (e.g., subscribing to an event stream). The LSU module 420 compares recently-obtained local state information to information already stored in the local state repository 400. If the information matches, then the LSU module 420 takes no further action (until local state information is obtained again). If they differ, then the LSU module 420 stores the recently-obtained information in the local state repository 400, executes the policy compilation module 410 to re-generate the management module configuration 134 (and re-configures the management module 132 accordingly), and notifies the global manager 120 of the change. In one embodiment, the LSU module 420 sends changes to local state information to the global manager 120 in "diff" format, which describes differences between the local state information that was previously stored in the local state repository 400 (and, therefore, previously sent to the global manager 120) and the recently-obtained local state information. For example, the diff format specifies a type of local state information (e.g., operating system) and a new value for that information type.

In another embodiment, the LSU module 420 sends the entire contents of the local state repository 400 to the global manager 120.

The local security module 430 is described below in the section entitled "Additional Security Aspects."

Figure 5:
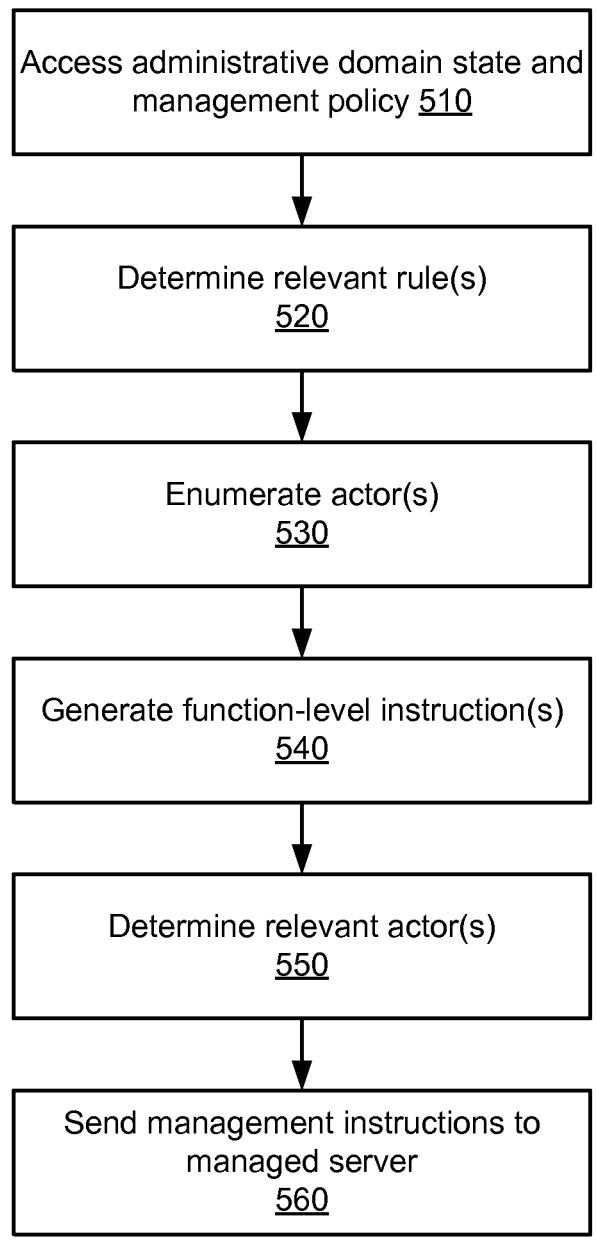
FIG. 5 is a flowchart illustrating a method of generating management instructions for a particular managed server, according to one embodiment.

FIG. 5 is a flowchart illustrating a method 500 of generating management instructions for a particular managed server 130, according to one embodiment. Other embodiments can perform the steps in different orders and can include different and/or additional steps. In addition, some or all of the steps can be performed by entities other than those shown in FIG. 1. In one embodiment, the method 500 is executed multiple times (e.g., once for each managed server 130 in an administrative domain 150).

When the method 500 starts, the state of the administrative domain's computer network infrastructure 320 and an administrative domain-wide management policy 330 have already been stored in the repository 300 of the global manager 120. At this point, the method 500 begins.

In step 510, the administrative domain state 320 and the administrative domain-wide management policy 330 are accessed. For example, the policy engine module 340 sends a request to the repository 300 and receives the administrative domain state 320 and the administrative domain-wide management policy 330 in response.

In step 520, one or more relevant rules are determined. For example, the policy engine module 340 executes the relevant rules module 350, providing as input the administrative domain-wide management policy 330 and the UID of the particular managed server 130. The relevant rules module 350 outputs a set of rules that are relevant to that server (management policy perspective).

In step 530, actors are enumerated. For example, the policy engine module 340 executes the actor enumeration module 370, providing as input the administrative domain state 320. The actor enumeration module 370 generates a representation of the managed servers 130 and unmanaged device groups (UDGs) within the administrative domain state 320 in an enumerated form (actor-sets).

In step 540, one or more function-level instructions are generated. For example, the policy engine module 340 executes the function-level instruction generation module 360, providing as input the management policy perspective (generated in step 520). The function-level instruction generation module 360 generates function-level instructions.

In step 550, one or more relevant actors is determined. For example, the policy engine module 340 executes the relevant actors module 380, providing as input the actor-sets (generated in step 530) and the management policy perspective (generated in step 520). The relevant actors module 380 outputs only those actor-sets that are relevant to those rules (relevant actor-sets).

In step 560, management instructions are sent to the particular managed server 130. For example, the policy engine module 340 sends the function-level instructions (generated in step 540) and the relevant actor-sets (generated in step 550) to the particular managed server 130.

Note that steps 520 and 540 concern generating the management policy perspective (and resulting function-level instructions) for a particular managed server 130, while steps 530 and 550 concern generating the actor perspective for that managed server. The generation of the management policy perspective and the generation of the actor perspective are minimally dependent on each other, since step 520 generates a set of rules that is used by step 550. Even so, keeping the management policy calculations (i.e., steps 520 and 540) and the actor-set calculations (i.e., steps 530 and 550) separate enhances the scalability of the policy engine module 340. Since the management policy calculations and the actor-set calculations are kept mostly separate, they can be performed in parallel (e.g., even for the same managed server 130). In addition, perspective calculations for different managed servers 130 can also be performed in parallel. Also, if an actor changes, then only the actor-sets need to be recalculated. (The function-level instructions do not need to be recalculated.) If a rule changes, then only the function-level instructions and the relevant actor-sets need to be recalculated. (The actors do not need to be re-enumerated.)

Figure 6:
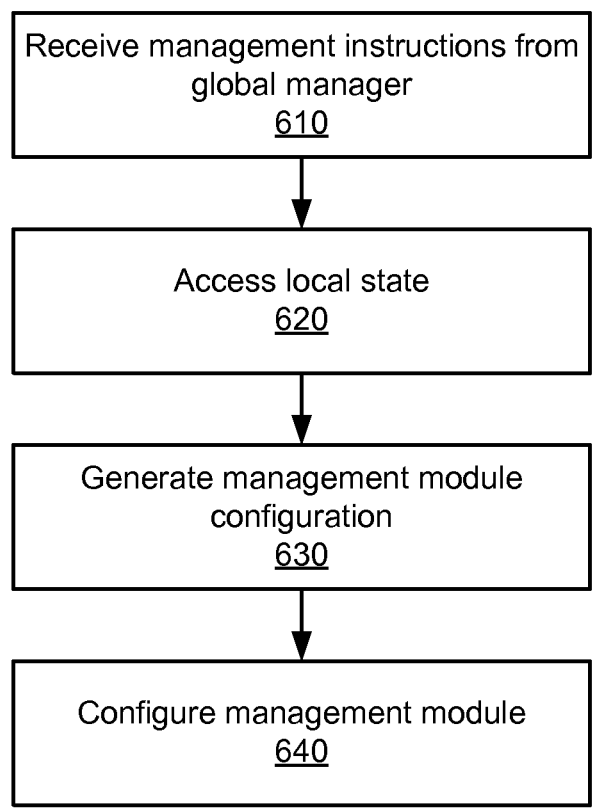
FIG. 6 is a flowchart illustrating a method of generating a configuration for a management module of a managed server, according to one embodiment.

FIG. 6 is a flowchart illustrating a method 600 of generating a configuration 134 for a management module 132 of a managed server 130, according to one embodiment. Other embodiments can perform the steps in different orders and can include different and/or additional steps. In addition, some or all of the steps can be performed by entities other than those shown in FIG. 1.

When the method 600 starts, information regarding the local state of the managed server 130 has already been stored in the local state repository 400 of the policy implementation module 136 in the managed server 130. At this point, the method 600 begins.

In step 610, management instructions are received from the global manager 120. For example, the policy compilation module 410 receives function-level instructions and relevant actor-sets from the global manager 120.

In step 620, the local state is accessed. For example, the policy compilation module 410 accesses information regarding the local state of the managed server 130 that is stored in the local state repository 400.

In step 630, a management module configuration 134 is generated. For example, the policy compilation module 410 takes as input the management instructions (received in step 610) and the local state (accessed in step 620) and generates a management module configuration 134.

In step 640, a management module 132 is configured. For example, the policy compilation module 410 configures the management module 132 to operate in accordance with the management module configuration 134 (generated in step 630).

Figure 7:
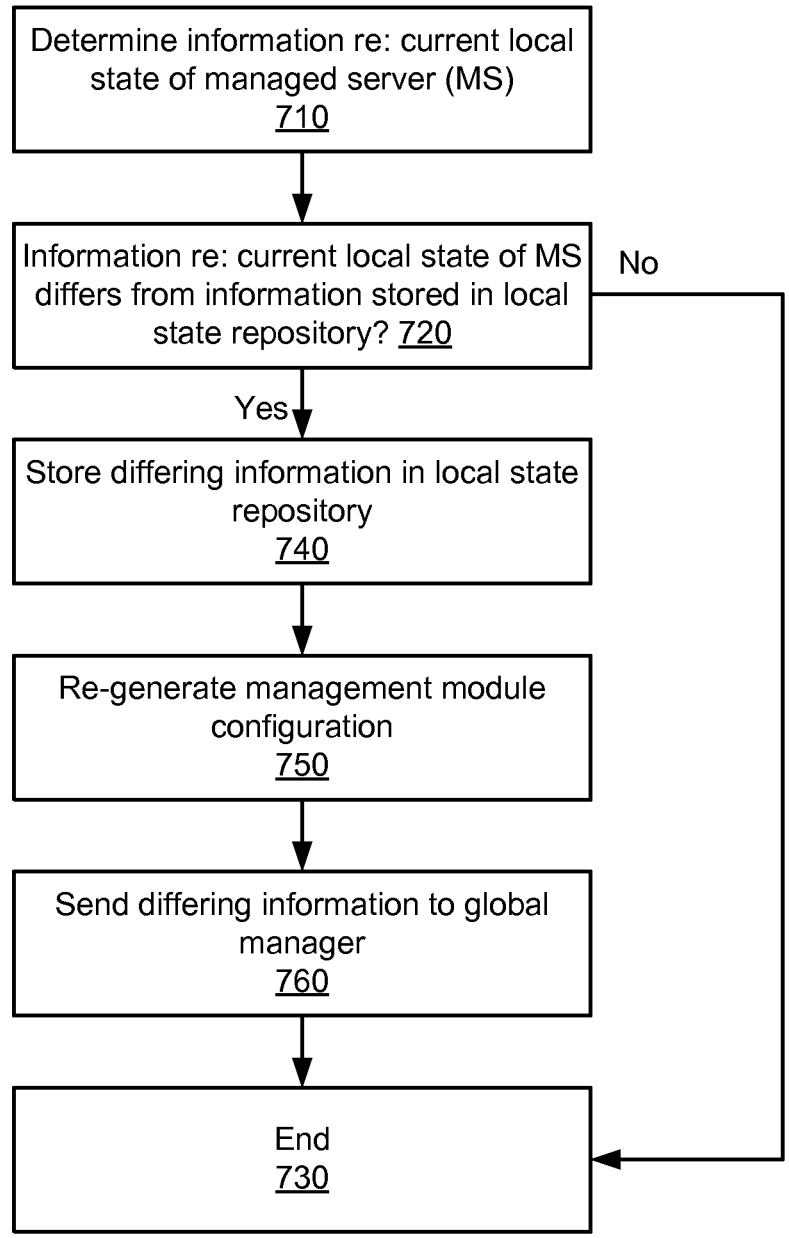
FIG. 7 is a flowchart illustrating a method of monitoring local state of a managed server and sending local state information to a global manager, according to one embodiment.

FIG. 7 is a flowchart illustrating a method 700 of monitoring local state of a managed server 130 and sending local state information to a global manager 120, according to one embodiment. Other embodiments can perform the steps in different orders and can include different and/or additional steps. In addition, some or all of the steps can be performed by entities other than those shown in FIG. 1.

When the method 700 starts, information regarding local state of the managed server 130 has already been stored in the local state repository 400 of the managed server 130. At this point, the method 700 begins.

In step 710, information regarding the current local state of the managed server 130 is determined. For example, the LSU module 420 determines the local state of the managed server 130 by inspecting various parts of the server's operating system (OS) and/or file system.

In step 720, a determination is performed regarding whether information regarding the current local state differs from information stored in the local state repository 400. For example, the LSU module 420 performs this determination. If the information does not differ, then the method proceeds to step 730 and ends. If the information does differ, then the method proceeds to step 740.

In step 740, the differing information is stored in the local state repository 400. For example, the LSU module 420 performs this step.

In step 750, the management module configuration 134 is re-generated (because the contents of the local state repository 400 have changed), and the management module 132 is re-configured accordingly. For example, the LSU module 420 executes the policy compilation module 410, which re-generates the management module configuration 134.

In step 760, the differing information is sent to the global manager 120. For example, the LSU module 420 performs this step.

Figure 8:
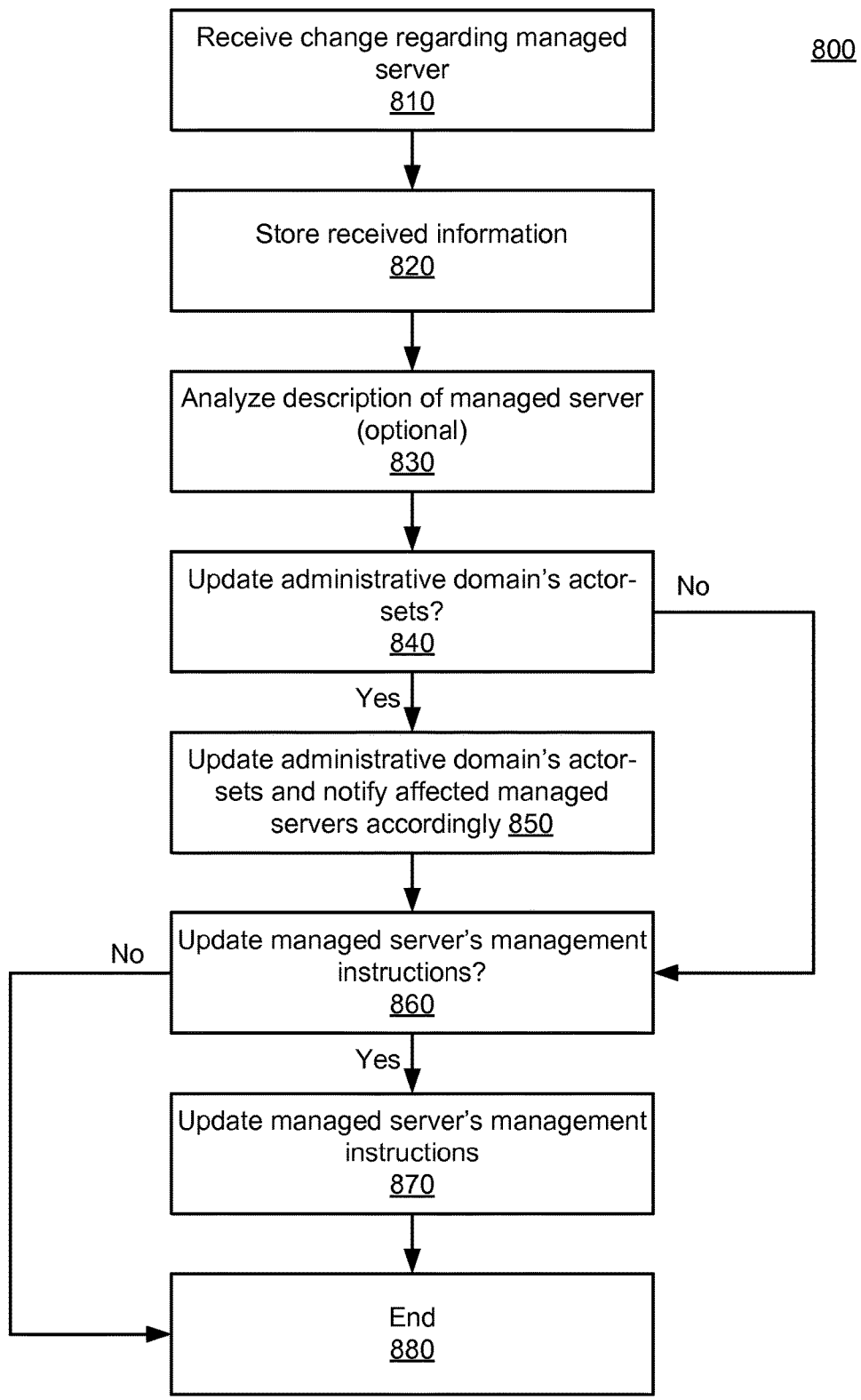
FIG. 8 is a flowchart illustrating a method of processing a change to the state of an administrative domain's computer network infrastructure, according to one embodiment.

FIG. 8 is a flowchart illustrating a method 800 of processing a change to the state of an administrative domain's computer network infrastructure 320, according to one embodiment. Other embodiments can perform the steps in different orders and can include different and/or additional steps. In addition, some or all of the steps can be performed by entities other than those shown in FIG. 1.

In step 810, a change regarding a particular managed server 130 is received. For example, the administrative domain state update (ADSU) module 385 receives an online/offline indicator, an operating system indicator, network exposure information, and/or service information from the managed server 130 as part of local state information.

In step 820, the received information is stored. For example, the ADSU module 385 stores the received online/offline indicator, network exposure information, and/or service information in the administrative domain state 320 (specifically, in the description of the managed server 130 to which the information pertains).

In step 830, the server description is analyzed to determine additional information regarding the server. For example, the ADSU module 385 uses a label/configured characteristic engine to calculate labels/CC values for the server and/or determines whether the server is behind a network address translator (NAT) (and, if it is behind a NAT, what type of NAT—1:1 or 1:N) and stores that information in the server description. Step 830 is optional.

In step 840, a determination is made regarding whether to update the administrative domain's actor-sets. For example, the ADSU module 385 determines whether to update the administrative domain's actor-sets based on a change to the managed server's description. If a determination is made to update the administrative domain's actor-sets, then the method proceeds to step 850. If a determination is made not to update the administrative domain's actor-sets, then the method proceeds to step 860.

In step 850, the administrative domain's actor-sets are updated. For example, the ADSU module 385 instructs the policy engine module 340 to update the administrative domain's actor-sets and notify affected managed servers 130 accordingly. In one embodiment (not shown), the ADSU module 385 waits for an event to occur before instructing the policy engine module 340 to update the administrative domain's actor-sets.

In step 860, a determination is made regarding whether to update the managed server's management instructions. For example, the ADSU module 385 determines whether to update the managed server's management instructions based on a change to the managed server's description. If a determination is made to update the managed server's management instructions, then the method proceeds to step 870. If a determination is made not to update the managed server's management instructions, then the method proceeds to step 880.

In step 870, the managed server's management instructions are updated. For example, the ADSU module 385 instructs the policy engine module 340 to update the managed server's management instructions. In one embodiment (not shown), the ADSU module 385 waits for an event to occur before instructing the policy engine module 340 to update the managed server's management instructions.

In step 880, the method ends.

Additional Security Aspects

Recall that the policy implementation module 136 of a managed server 130 includes a local security module 430. The local security module 430 collects security-related information ("security metadata") from the managed server 130 and sends the collected information to the global manager 120. Local security modules 430 enable managed servers 130 to act as distributed detection nodes or probes in the administrative domain 150. In one embodiment, the local security module 430 collects and sends any or all of the following security-related information:

a) Identification of a rogue process and/or a rogue action—The local security module 430 detects "rogue processes" running on the managed server 130. A rogue process is a process that performs (or attempts to perform) an improper action ("rogue action"), such as an action that violates the management policy implemented by the management module configuration 134. For example, if the management policy includes an access control rule that specifies allowable network connections, then attempting to connect (e.g., initiating a network connection) to a device that is not listed as allowable would be a rogue action. Specifically, if the access control rule states that a connection is allowed if the provider is a database server and the consumer is a web server, then a database server attempting to act as a consumer with a web server acting as a provider would be a rogue action. In one embodiment, the local security module 430 accesses instructions that describe the management policy for allowed actions. Any nonconformance to that policy constitutes a rogue action.

Recall that process information includes, for example, names of processes that the managed server 130 is running, which network ports and network interfaces those processes are listening on, which users initiated those processes, configurations of those processes, command-line launch arguments of those processes, and dependencies of those processes. A rogue action can concern any type of process information. For example, listening on the "wrong" network port or network interface (e.g., a network port or network interface that is not specified by the management policy as being allowed) can be a rogue action. As another example, executing under the context of the "wrong" user or users (e.g., a user that is not specified by the management policy as being allowed) can be a rogue action. As yet another example, loading unusual or unauthorized shared objects can be a rogue action.

In one embodiment, if the local security module 430 detects a rogue process/action, then the local security module sends the global manager 120 information regarding the rogue action (e.g., performed by the rogue process), information regarding the rogue process itself (e.g., process information), and/or information regarding additional actions performed by the rogue process, such as domain name system (DNS) lookups requested and network connections attempted and/or made. Information regarding the rogue action includes, for example, a type of the rogue action (e.g., listening on the wrong network port or interface or executing under the context of the wrong user), details of the rogue action based on its type (e.g., the wrong network port or interface that was listened on or the wrong user under whose context the process executed), and/or a timestamp indicating when the rogue action occurred. Information regarding a DNS lookup includes, for example, the information that was sent to the DNS to lookup. Information regarding a network connection includes, for example, an IP address and/or a port number of the destination device. Rogue process/action information can be used to identify "bad" managed servers 130, where a managed server is "bad" if it performs (or attempts to perform) an action that violates the management policy implemented by the management module configuration 134.

Figure 9:
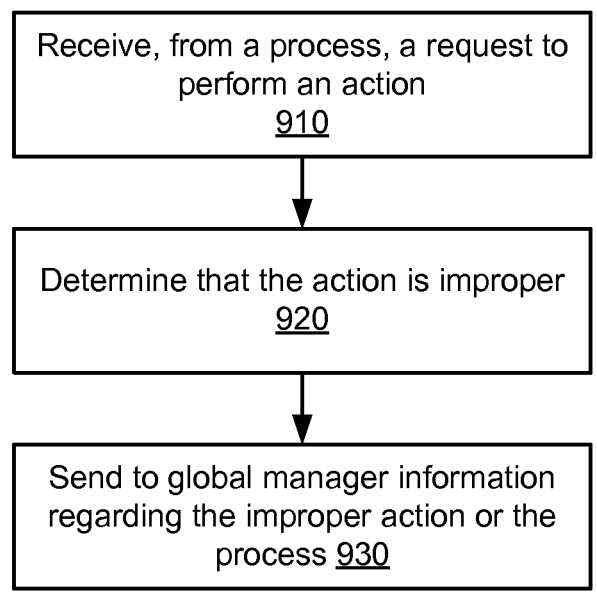
FIG. 9 is a flowchart illustrating a method of detecting and reporting a rogue process, according to one embodiment.

FIG. 9 is a flowchart illustrating a method 900 of detecting and reporting a rogue process, according to one embodiment. Other embodiments can perform the steps in different orders and can include different and/or additional steps. In addition, some or all of the steps can be performed by entities other than those shown in FIG. 1.

When the method 900 starts, a management module 132 within a managed server 130 has already been configured according to a management module configuration 134. The managed server 130 configured the management module 132 using management instructions received from a global manager 120. The configured management module 132 implements an administrative domain-wide management policy 330. At this point, the method 900 begins.

In step 910, a request to perform an action is received from a process executing on the managed server 130. For example, the local security module 430 receives the request.

In step 920, a determination is made that the action is improper according to the configured management module 132 within the managed server 130. For example, the local security module 430 sends the request to the management module 132, which then analyzes the request to determine whether the request complies with the administrative domain-wide management policy 330. The local security module 430 receives a response from the management module 132 indicating that the request does not comply with the administrative domain-wide management policy 330. Based on the received response, the local security module 430 determines that the action is improper.

In step 930, information is sent to the global manager regarding the improper action or regarding the process. For example, the local security module 430 sends the global manager information regarding the improper action (e.g., a type of the improper action, details of the improper action based on the improper action's type, or a timestamp indicating when the improper action occurred) or information regarding the process that requested to perform the action (e.g., a name of the process, a network port on which the process is listening, a network interface on which the process is listening, a user that initiated the process, a configuration of the process, a command-line launch argument of the process, or a dependency of the process).

b) Identification of operating system-level tampering—The local security module 430 detects operating system-level tampering (e.g., a modification to the management module configuration 134).

c) Logs—The local security module 430 obtains logs from the managed server 130 and sends the logs to the global manager 120. The logs include, for example, firewall logs (e.g., web-based L7 rule and signature-based attacks reported by a web application firewall (WAF) engine), intrusion detection system (IDS) logs (e.g., traditional L7 signature-based intrusion detection events from an IDS engine), and authentication logs (e.g., secure shell (SSH) authentication logs). In one embodiment, these logs are normalized into a standard format so that they are easier to analyze. The normalization can be performed at the managed server 130 and/or at the global manager 120.

d) Identification of a detected intrusion—The local security module 430 detects intrusions using various techniques. For example, the local security module 430 uses some basic intrusion signatures in conjunction with iptables. As another example, the local security module 430 tracks some activities associated with IP addresses and compares the amount of tracked activities to some thresholds (e.g., to detect SSH brute force attacks).

e) Identification of a "bad actor"—The local security module 430 compares known "bad actors" (e.g., devices whose IP addresses are associated with low reputations and/or security threats) to IP addresses blocked by the managed server 130. While a bad actor is typically an unmanaged device 140, a bad actor could be a managed server 130. In one embodiment, the identification of the bad actor is provided to the global manager 120 in the form of a log stream.

In one embodiment, the local security module 430 also performs its own security functions. For example, the local security module 430 detects when a process on the managed server 130 creates a new outbound connection. The local security module 430 accesses a list of known bad actors (unmanaged devices 140 and/or managed servers 130) and determines whether the destination device of the outbound connection is on the list. If the destination device is on the list, then the local security module 430 blocks the outbound connection in order to prevent extrusions. In another embodiment, the local security module 430 uses local attack thresholds and heuristics to apply blocking policy locally.

Recall that the repository 300 of the global manager 120 includes a global security data repository 335. The global security data repository 335 stores security-related information ("security metadata"). This information includes, for example, rogue processes and/or rogue actions, operating system-level tampering, logs, detected intrusions, and bad actors.

Recall that the processing server 310 of the global manager 120 includes a global security module 390. The global security module 390 receives security-related information ("security metadata") from managed servers 130 and stores that information in the global security data repository 335. This information includes, for example, rogue processes and/or rogue actions, operating system-level tampering, logs, detected intrusions, and bad actors.

The global security module 390 also analyzes information stored in the global security data repository 335 and modifies the administrative domain state 320 and/or the administrative domain-wide management policy 330 based on the results of the analysis, as appropriate. The analysis of information stored in the global security data repository 335 detects attacks and/or vulnerabilities. The global security module 390 can detect an attack or a vulnerability on a single managed server 130 as well as across the administrative domain 150 as a whole.

The modification of the administrative domain state 320 and/or the management policy 330 performs global enforcement. Recall that the administrative domain state 320 includes descriptions of managed servers 130 and (optionally) descriptions of unmanaged devices 140. In one embodiment, the administrative domain state 320 stores information regarding policy violations of managed servers 130. For example, the global security module 390 analyzes, for a particular managed server 130, the rogue process/action information stored in the global security data repository 335. The global security module 390 then sets a policy violation-specific configured characteristic of that managed server to a particular value, such as a number of violations performed or attempted (1, 2, 3, etc.). In another embodiment, the administrative domain state 320 stores information regarding tampering with managed servers 130. For example, the global security module 390 analyzes, for a particular managed server 130, the operating system-level tampering information stored in the global security data repository 335. The global security module 390 then sets a tampering-specific configured characteristic of that managed server to a particular value, such as a Boolean value that indicates the presence/absence of tampering.

In another embodiment, the administrative domain state 320 stores information regarding one or more Unmanaged Device Groups (UDG). Members of a first UDG are known attackers or bad actors (e.g., unmanaged devices 140 that pose security threats). The global security module 390 maintains this bad-actor UDG by adding or removing attackers/bad actors as necessary. For example, the global security module 390 uses the log information, detected intrusion information, and/or bad actor information stored in the global security data repository 335 to identify a "bad" unmanaged device 140. If the global security module 390 identifies a particular attacker or bad actor, then the global security module adds that actor to the bad-actor UDG. In one embodiment, the bad-actor UDG is used to identify unmanaged devices 140 whose network connections (to or from a managed server 130) should be blocked, as described below. In another embodiment, the bad-actor UDG is used in the administrative domain-wide management policy 330 (e.g., within the provided-by or used-by portion of a rule).

Members of other UDGs are known to be "risky" and have associated "risk scores." For example, members of a first risky UDG have risk scores of "1", members of a second risky UDG have risk scores of "2", etc. The global security module 390 maintains the risky UDGs by adding or removing unmanaged devices 140 as necessary. For example, the global security module 390 uses the log information, detected intrusion information, and/or bad actor information stored in the global security data repository 335 to identify a risky unmanaged device 140 and that device's risk score. If the global security module 390 identifies a particular risky unmanaged device 140, then the global security module adds that unmanaged device to the appropriate risky UDG (based on the unmanaged device's risk score). In one embodiment, a risky UDG is used to tweak, tune, refine, or improve the operation of the local security module 430, as described below. In another embodiment, a risky UDG is used in the administrative domain-wide management policy 330 (e.g., within the provided-by or used-by portion of a rule).

The administrative domain state update module 385 receives changes to the administrative domain state 320 and processes the changes accordingly, as explained above. This enables the detection of an attack on one managed server 130 to be distributed as a dynamic enforcement policy to other managed servers so that they are protected. In other words, a feedback loop exists where the managed servers 130 send security-related information to the global manager 120, and the global manager 120 generates management instructions based on the security-related information and sends the instructions to the managed servers 130.

In particular, updated relevant actor-sets (e.g., actor-sets associated with changed UDGs or changed managed servers) might be sent to various managed servers 130. In one embodiment, receipt of the updated relevant actor-sets causes those managed servers to reconfigure their management modules 132. For example, the reconfigured management modules 132 might cease allowing communications to and/or from unmanaged devices 140 that are members of the first UDG (thereby blocking all of these communications). In another embodiment, receipt of the updated relevant actor-sets causes the local security modules 430 in those managed servers to operate differently. For example, the local security modules 430 might modify or tune their analyses such that data is analyzed differently based on the risk score of an unmanaged device 140. The threshold for reporting security information regarding a particular unmanaged device 140 might be lower if the device's risk score is high. As another example, the local security modules 430 might block different outbound connections based on an updated bad-actor UDG.

Note that an attack might be distributed so that any one single managed server 130 might not know that it is under attack. Since the managed servers 130 send security-related information to the global manager 120, the global security module 390 can detect attack patterns across the administrative domain 150 that no single probe in any one part of the domain could see in isolation. When a domain-wide attack is detected by the global security module 390, the global security module can follow the same mechanism as described above (namely, modifying the administrative domain state 320) to distribute dynamic enforcement policy to other managed servers 130 so that they are protected.

Since the global security module 390 has access to both application-based anomalies and network-based anomalies, its analysis of information stored in the global security data repository 335 is more accurate. The global security module 390 can also act more quickly and does not need to wait for longer periods of time before taking enforcement action (e.g., modifying the administrative domain state 320). Also, the global security module 390 can identify an attack that is unique to a particular administrative domain 150. That attack could be targeting only that domain, and the attack would be "in the noise" on other internet-scale security systems. Also, because of the placement of the managed servers 130 (specifically, their policy implementation modules 136) in the administrative domain 150, the global security module 390 is also capable of catching internal threats from within the domain from insiders or, alternately, botnets that have made it through the domain's perimeter defenses and are now trying to move sideways within the domain.

In one embodiment, the global security module 390 also performs one or more of the following functions:

a) Statistical analysis of information stored in the global security data repository 335—The global security module 390 analyzes information stored in the global security data repository 335 to determine the top "N" items in different categories. The categories can be, for example, the top individual nodes that are communicating, the top pairs of nodes that are communicating, the top IP addresses blocked by managed servers 130, and the top IP addresses allowed by managed servers with high risk scores. The statistics can be calculated on multiple levels, such as per managed server, per datacenter, per business unit, and per administrative domain 150.

b) Identification of "bad actors"—The global security module 390 identifies bad actors using configured thresholds of activities.

In one embodiment, the global security module 390 is extensible and/or security analytics functions can be implemented to provide both global alerting and dynamic enforcement based on different threats and attack types.

Now that the global security module 390 has been described, it is helpful to work through an example. The environment 100 (especially the global manager 120 and the managed servers 130) enables a managed server to be put into "quarantine mode." Quarantine mode isolates a particular managed server 130 from other managed servers. For example, an infected or badly-behaving managed server 130 is quarantined from the rest of the "healthy" managed servers.

When a managed server 130 is in quarantine, other managed servers (specifically, their management modules 132) block inbound network traffic that originated from the quarantined server. In addition, the management module 132 installed on the quarantined server puts itself into a configurable self-quarantine mode where (by default) outbound network traffic is blocked, and only administrative inbound network traffic is allowed. If the quarantined server has been rooted and the attacker is smart enough, then the self-quarantine mode can be circumvented. However, in a large number of cases of less sophisticated viruses (and in cases where an infected system does not yet have a malicious payload and is just performing reconnaissance), self-quarantine mode helps provide an additional layer of protection. Even in the case of a very advanced threat, other managed servers 130 provide isolation from the quarantined server.

In one embodiment, quarantine mode is implemented as follows: First, the global security module 390 determines to quarantine a particular managed server 130. For example, the global security module 390 determines that a network attack originated from the particular managed server 130 or the particular managed server 130 has a vulnerability. This determination can be based on, for example, an action performed by the global manager 120 (e.g., analysis of information stored in the global security data repository 335) and/or a notification received by the global manager from an external source (e.g., a managed server 130, a third-party vulnerability scanner, or a user command). A notification received from a managed server 130 can concern, for example, a rogue process/action or operating system-level tampering. A notification received from a vulnerability scanner can concern, for example, devices that have vulnerabilities. A notification received from a user command can concern, for example, a bad actor that was identified by a person using any possible means.

Then, the global security module 390 modifies the administrative domain state 320 to indicate that the particular managed server 130 is quarantined. For example, the global security module 390 adds the particular managed server 130 to a special quarantine actor-set (referred to herein as Actor-Set Q or "ASQ"). The administrative domain state 320 stores information regarding Actor-Set Q, whose members are quarantined. The global security module 390 maintains Actor-Set Q by adding or removing managed servers 130 as necessary.

In another example, the global security module 390 sets a quarantine-specific configured characteristic (referred to herein as "$CC_Q$") to a particular value, such as a threat level (1, 2, 3, etc.). $CC_Q$ can be used to define Actor-Set Q conditionally, where each member of Actor-Set Q has a $CC_Q$ value greater than zero ("$CC_Q>0$"). $CC_Q$ can also be used to conditionally define multiple quarantine actor-sets (e.g., one quarantine actor-set for each threat level, where each member of that actor-set has the same $CC_Q$ value). $CC_Q$ can also be used in conjunction with a rule's condition portion (a Boolean expression) to specify whether the rule applies to a particular managed server 130. For example, a condition portion of "$CC_Q=0$" excludes all quarantined servers, regardless of their threat levels. This condition portion can be used with a whitelist-model rule to prevent quarantined servers from acting as providers or consumers.

A quarantine actor-set, whether defined conditionally or by explicitly-assigned members, can be used in the administrative domain-wide management policy 330 within a rule's used-by (UB) portion or provided-by (PB) portion. Specifically, a quarantine actor-set can be used as part of a set difference calculation (e.g., subtraction of common set members). For example, the UB portion "* -<quarantine actor-set>" specifies that anybody except members of the quarantine actor-set can use a service, where the wildcard character "*" denotes anybody, the subtraction character "-" denotes "except", and "<quarantine actor-set>" denotes any type of quarantine actor-set (whose members could be, for example, all quarantined managed servers or only managed servers with particular $CC_Q$ values (e.g., $CC_Q>2$ or $CC_Q<5$)). A quarantine actor-set can also be used to positively indicate a provider or consumer. For example, the PB portion "<quarantine actor-set>" specifies that members of the quarantine actor-set provide a service, such as allowing connections from devices that are part of an administrative security response team.

Note that using $CC_Q$ in a rule's condition portion can be logically equivalent to using a quarantine actor-set in a set difference calculation in a rule's UB portion or PB portion. For example, a first rule with <UB=Web, PB=Database, Condition="$CC_Q=0$"> is logically equivalent to a second rule with <UB=Web-ASQ, PB=Database-ASQ>, where $CC_Q$ defines ASQ conditionally ($CC_Q>0$).

The administrative domain state update module 385 receives this change to the administrative domain state 320 and processes the change accordingly, as explained above. In particular, updated management instructions (e.g., relevant actor-sets and/or function-level instructions) are sent to managed servers 130. Receipt of the updated management instructions causes those managed servers (specifically, their policy compilation modules 410) to generate new management module configurations 134 and reconfigure their management modules 132 accordingly. The new management module configurations 134 are generated based on the updated management instructions.

For a quarantined managed server 130, the received updated management instructions cause that server to enter self-quarantine mode. For example, if the function-level instructions follow a whitelist-type model (e.g., providing an exhaustive list of what the server may do), then the updated function-level instructions might be a subset of the previously-received function-level instructions. As a result, the quarantined managed server 130 will not be allowed to perform as many tasks as it did when it was not quarantined.

For a non-quarantined managed server 130, the received updated management instructions (specifically, any quarantine actor-sets and/or quarantine function-level instructions) cause that server to isolate the quarantined server. (Note that the quarantine function-level instructions need not be sent again from the global manager 120 to the managed servers 130 if those instructions were previously sent and have not changed.) In particular, the policy compilation module 410 applies the quarantine function-level instructions to members of the quarantine actor-sets and does not apply the standard function-level instructions to those members. The reconfiguration of the management module 132 causes the management module to block inbound traffic from the members of the quarantine actor-sets (i.e., the quarantined managed servers 130).

At some point, it might be appropriate to "unquarantine" a quarantined managed server 130 (i.e., release the server from quarantine mode). For example, if the quarantined managed server 130 has been made safe (e.g., by removing malicious software or vulnerabilities), then it might be appropriate to unquarantine that server. Once the managed server 130 is unquarantined, it will no longer be isolated from other managed servers and will be released from self-quarantine mode.

In one embodiment, releasing a quarantined managed server 130 from quarantine mode is implemented as follows: First, the global security module 390 determines to release a particular managed server 130 from quarantine. For example, the global security module 390 determines that the managed server 130 no longer poses a security threat. This determination can be based on, for example, an action performed by the global manager 120 (e.g., analysis of information stored in the global security data repository 335) and/or a notification received by the global manager from an external source (e.g., a third-party vulnerability scanner or a user command).

A notification received from a vulnerability scanner can concern, for example, devices that have vulnerabilities. In one embodiment, the vulnerability notification lists devices that previously had vulnerabilities but no longer do. In another embodiment, the vulnerability notification lists devices that currently have vulnerabilities. In that embodiment, the global security module 390 can compare a recent vulnerability notification to an old vulnerability notification to determine which devices previously had vulnerabilities but no longer do. A notification received from a user command can concern, for example, a managed server 130 that was identified by a person as no longer posing a security threat.

Then, the global security module 390 modifies the administrative domain state 320 to indicate that the particular managed server 130 is released from quarantine. For example, the global security module 390 removes the particular managed server 130 from a special quarantine actor-set. In another example, the global security module 390 sets a quarantine-specific configured characteristic to a particular value, such as a threat level (e.g., 0 for no threat).

The administrative domain state update module 385 receives this change to the administrative domain state 320 and processes the change accordingly, as explained above. In particular, updated management instructions (e.g., relevant actor-sets and/or function-level instructions) are sent to managed servers 130. Receipt of the updated management instructions causes those managed servers (specifically, their policy compilation modules 410) to generate new management module configurations 134 and reconfigure their management modules 132 accordingly. The new management module configurations 134 are generated based on the updated management instructions.

For a managed server 130 released from quarantine, the received updated management instructions cause that server to exit self-quarantine mode. For example, if the function-level instructions follow a whitelist-type model (e.g., providing an exhaustive list of what the server may do), then the updated function-level instructions might be a superset of the previously-received function-level instructions. As a result, the unquarantined managed server 130 will be allowed to perform more tasks than it did when it was quarantined.

For a different managed server 130, the received updated management instructions (specifically, any quarantine actor-sets and/or quarantine function-level instructions) cause that server to stop isolating the newly-unquarantined server. In particular, the policy compilation module 410 applies the quarantine function-level instructions to members of the quarantine actor-sets (which no longer include the newly-unquarantined server) and does not apply the standard function-level instructions to those members. The reconfiguration of the management module 132 causes the management module to block inbound traffic from the members of the quarantine actor-sets.

Figure 10:
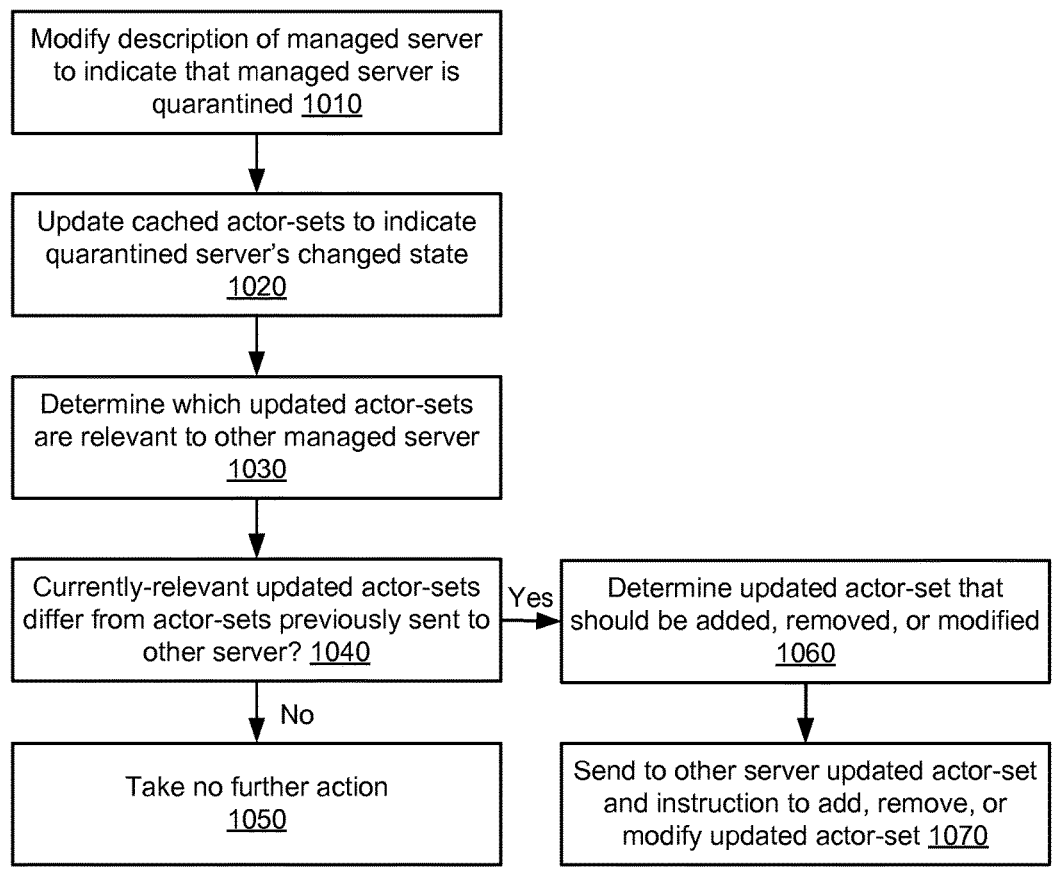
FIG. 10 is a flowchart illustrating a method of quarantining a managed server within an administrative domain, according to one embodiment.

FIG. 10 is a flowchart illustrating a method 1000 of quarantining a managed server 130 within an administrative domain 150, according to one embodiment. The administrative domain 150 includes a plurality of managed servers 130 that use management instructions to configure management modules 132 so that the configured management modules implement an administrative domain-wide management policy that comprises a set of one or more rules, so that the quarantined managed server is isolated from other managed servers in the plurality of managed servers. Other embodiments can perform the steps in different orders and can include different and/or additional steps. In addition, some or all of the steps can be performed by entities other than those shown in FIG. 1.

When the method 1000 starts, a description of a managed server 130 (the managed server that will be quarantined) has already been stored in an administrative domain state 320 of a global manager 120. Also, actor-sets for the administrative domain have already been cached in the global manager 120. Finally, a management policy perspective and relevant actor-sets have already been cached in association with another managed server 130 (different from the quarantined managed server). At this point, the method 1000 begins.

In step 1010, the description of the managed server 130 is modified to indicate that the managed server is quarantined. For example, the global security module 390 modifies the administrative domain state 320 by setting a quarantine-specific configured characteristic of the managed server 130 to a particular value, thereby specifying a description of the quarantined managed server.

In step 1020, cached actor-sets are updated to indicate the quarantined managed server's changed state. For example, the global security module 390 uses the actor enumeration module 370 to update the cached actor-sets for the administrative domain, thereby specifying updated actor-sets.

In step 1030, a determination is made regarding which updated actor-sets are relevant to the other managed server 130. For example, the global security module 390 uses the relevant actors module 380 to determine which updated actor-sets are relevant to the other managed server 130, thereby specifying currently-relevant updated actor-sets.

In step 1040, a determination is made regarding whether the currently-relevant updated actor sets differ from actor-sets previously sent to the other managed server 130. For example, the global security module 390 compares the currently-relevant updated actor sets to actor-sets previously sent to the other managed server 130 (which were cached in association with the other managed server as "relevant actor-sets"). Responsive to determining that the currently-relevant updated actor-sets do not differ from (e.g., are identical to) the previously-sent actor-sets, the method 1000 proceeds to step 1050. Responsive to determining that the currently-relevant updated actor-sets do differ from the previously-sent actor-sets, the method 1000 proceeds to step 1060.

In step 1050, no further action is taken. For example, the global security module 390 takes no further action.

In step 1060, an updated actor-set that should be added, removed, or modified relative to the previously-sent actor-sets is determined. For example, the global security module 390 compares the currently-relevant updated actor sets to actor-sets previously sent to the other managed server 130.

In step 1070, the updated actor-set and an instruction to add, remove, or modify the updated actor-set are sent to the other managed server. For example, the global security module 390 sends the updated actor-set and the instruction to the other managed server.

Figure 11:
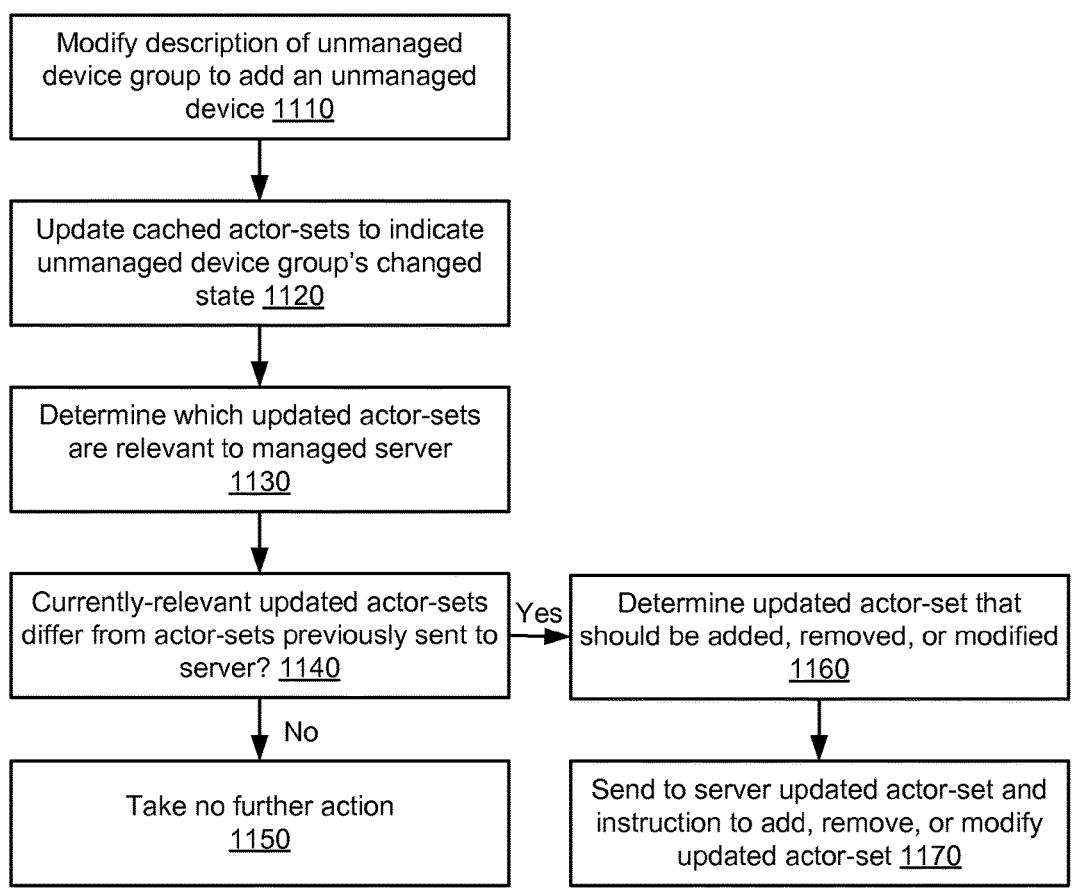
FIG. 11 is a flowchart illustrating a method of processing a change to a state of a group of unmanaged devices within an administrative domain, according to one embodiment.

FIG. 11 is a flowchart illustrating a method 1100 of processing a change to a state of a group of unmanaged devices 140 within an administrative domain 150, according to one embodiment. The administrative domain 150 includes a plurality of managed servers 130 that use management instructions to configure management modules 132 so that the configured management modules implement an administrative domain-wide management policy that comprises a set of one or more rules. Other embodiments can perform the steps in different orders and can include different and/or additional steps. In addition, some or all of the steps can be performed by entities other than those shown in FIG. 1.

When the method 1100 starts, a description of an unmanaged device group (the unmanaged device group whose state changes) has already been stored in an administrative domain state 320 of a global manager 120. Also, actor-sets for the administrative domain have already been cached in the global manager 120. Finally, a management policy perspective and relevant actor-sets have already been cached in association with a managed server 130. At this point, the method 1100 begins.

In step 1110, the description of the unmanaged device group is modified to add an unmanaged device to the unmanaged device group. For example, the global security module 390 modifies the administrative domain state 320 by adding an unmanaged device to the unmanaged device group.

In step 1120, cached actor-sets are updated to indicate the unmanaged device group's changed state. For example, the global security module 390 uses the actor enumeration module 370 to update the cached actor-sets for the administrative domain, thereby specifying updated actor-sets.

In step 1130, a determination is made regarding which updated actor-sets are relevant to the managed server 130. For example, the global security module 390 uses the relevant actors module 380 to determine which updated actor-sets are relevant to the managed server 130, thereby specifying currently-relevant updated actor-sets.

In step 1140, a determination is made regarding whether the currently-relevant updated actor sets differ from actor-sets previously sent to the managed server 130. For example, the global security module 390 compares the currently-relevant updated actor sets to actor-sets previously sent to the managed server 130 (which were cached in association with the managed server as "relevant actor-sets"). Responsive to determining that the currently-relevant updated actor-sets do not differ from (e.g., are identical to) the previously-sent actor-sets, the method 1100 proceeds to step 1150. Responsive to determining that the currently-relevant updated actor-sets do differ from the previously-sent actor-sets, the method 1100 proceeds to step 1160.

In step 1150, no further action is taken. For example, the global security module 390 takes no further action.

In step 1160, an updated actor-set that should be added, removed, or modified relative to the previously-sent actor-sets is determined. For example, the global security module 390 compares the currently-relevant updated actor sets to actor-sets previously sent to the managed server 130.

In step 1170, the updated actor-set and an instruction to add, remove, or modify the updated actor-set are sent to the managed server. For example, the global security module 390 sends the updated actor-set and the instruction to the managed server.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of quarantining a bad actor within an administrative domain, the method comprising:
storing cached actor-sets, each of the cached actor sets specifying a group of actors present in the administrative domain;
storing a plurality of rules applicable to a particular managed server, each of the rules specifying a provider of a service, a user of the service, and a function controlling interactions between the provider and the user of the service, wherein each of the rules specifies at least one of the provider of the service and the user of the service as a set of managed servers using a label set, wherein a label of the label set represents a dimension of the managed servers and a value of the dimension;
storing in association with a given rule of the plurality of rules, relevant actor-sets comprising a subset of the cached actor-sets that each include at least one of the provider specified in the given rule and the user specified in the given rule;
receiving an instruction to quarantine the bad actor;
updating the cached actor-sets to indicate a change in state of the bad actor to a quarantined state;
identifying a changed actor-set in the relevant actor-sets for the given rule, wherein the changed actor-set was updated based on the change in state of the bad actor to the quarantined state;
responsive to identifying the changed actor-set,
sending, to the particular managed server, information describing the changed actor-set and an instruction to add, remove, or modify the changed actor-set in a local list stored by the particular managed server.

2. The method of claim 1, wherein the bad actor is a target managed server, and wherein the method further comprises:
modifying a description of the target managed server to indicate that the target managed server is quarantined by setting a value for a quarantine-specific configured characteristic of the target managed server.

3. The method of claim 1, further comprising determining to quarantine the bad actor.

4. The method of claim 3, wherein the bad actor is a target managed server, wherein determining to quarantine the target managed server comprises determining that a network attack originated from the target managed server or determining that the target managed server has a vulnerability.

5. The method of claim 1, wherein sending the information describing the changed actor-set and the instruction causes the particular managed server to block inbound network traffic that originated from the bad actor.

6. The method of claim 1, further comprising, prior to updating the cached actor-sets:
determining, based on a description of the bad actor, additional information regarding the bad actor; and
modifying the description of the bad actor to indicate the additional information.

7. The method of claim 1, wherein the bad actor is a target managed server, the method further comprising:
determining, based on a description of the target managed server, currently-relevant rules that are applicable to the target managed server after it is quarantined;
determining whether the currently-relevant rules differ from previously-relevant rules that were applicable to the target managed server prior to it being quarantined; and
responsive to determining that the currently-relevant rules differ from the previously-relevant rules: determining a rule that should be added, removed, or modified relative to the previously-relevant rules;
generating, based on the determined rule, a function-level instruction; and
sending, to the target managed server, the function-level instruction and an instruction to add, remove, or modify the function-level instruction.

8. The method of claim 7, wherein sending the function-level instruction and the instruction to add, remove, or modify causes the target managed server to block outbound network traffic.

9. The method of claim 7, wherein sending the function-level instruction and the instruction to add, remove, or modify causes the target managed server to allow only administrative inbound network traffic.

10. The method of claim 1, wherein the bad actor is a target managed server, the method further comprising:
determining a changed actor set relevant to the target managed server that was changed based on the target managed server becoming quarantined;
sending, to the target managed server, information describing the changed actor-set relevant to the target managed server and an instruction to add, remove, or modify the changed actor-set in a local list stored by the target managed server.

11. The method of claim 1, wherein the bad actor is an unmanaged device group, the method further comprising determining to add an unmanaged device to the unmanaged device group.

12. The method of claim 11, wherein determining to add the unmanaged device to the unmanaged device group comprises determining that the unmanaged device poses a security threat.

13. The method of claim 11, wherein sending the information describing the changed actor-set and the instruction causes the particular managed server to block inbound network traffic that originated from the unmanaged device or to block outbound network traffic that is destined for the unmanaged device.

14. The method of claim 1, wherein each of the cached actor-sets comprises one or more actor-set records, each actor-set record identifying a managed server or an unmanaged device group.

15. The method of claim 14, wherein at least one of the actor-set records comprises a unique identifier, an identifier of an operating system, or an IP address.

16. A non-transitory computer-readable storage medium storing computer program modules for quarantining a bad actor within an administrative domain, the computer program modules executable by a processor to perform steps comprising:
storing cached actor-sets, each of the cached actor sets specifying a group of actors present in the administrative domain;
storing a plurality of rules applicable to a particular managed server, each of the rules specifying a provider of a service, a user of the service, and a function controlling interactions between the provider and the user of the service, wherein each of the rules specifies at least one of the provider of the service and the user of the service as a set of managed servers using a label set, wherein a label of the label set represents a dimension of the managed servers and a value of the dimension;
storing in association with a given rule of the plurality of rules, relevant actor-sets comprising a subset of the cached actor-sets that each include at least one of the provider specified in the given rule and the user specified in the given rule;
receiving an instruction to quarantine the bad actor;
updating the cached actor-sets to indicate a change in state of the bad actor to a quarantined state;
identifying a changed actor-set in the relevant actor-sets for the given rule, wherein the changed actor-set was updated based on the change in state of the bad actor to the quarantined state;
responsive to identifying the changed actor-set,
sending, to the particular managed server, information describing the changed actor-set and an instruction to add, remove, or modify the changed actor-set in a local list stored by the particular managed server.

17. The non-transitory computer-readable storage medium of claim 16, wherein the bad actor is a target managed server, the method further comprising:
determining, based on a description of the target managed server, currently-relevant rules that are applicable to the target managed server after it is quarantined;
determining whether the currently-relevant rules differ from previously-relevant rules that were applicable to the target managed server prior to it being quarantined; and
responsive to determining that the currently-relevant rules differ from the previously-relevant rules: determining a rule that should be added, removed, or modified relative to the previously-relevant rules;
generating, based on the determined rule, a function-level instruction; and
sending, to the target managed server, the function-level instruction and an instruction to add, remove, or modify the function-level instruction.

18. The non-transitory computer-readable storage medium of claim 16, wherein the bad actor is a target managed server, the method further comprising:
determining a changed actor set relevant to the target managed server that was changed based on the target managed server becoming quarantined;
sending, to the target managed server, information describing the changed actor-set relevant to the target managed server and an instruction to add, remove, or modify the changed actor-set in a local list stored by the target managed server.

19. A system for quarantining a bad actor within an administrative domain, the system comprising:
a non-transitory computer-readable storage medium storing computer program modules executable to perform steps comprising:
storing cached actor-sets, each of the cached actor sets specifying a group of actors present in the administrative domain;
storing a plurality of rules applicable to a particular managed server, each of the rules specifying a provider of a service, a user of the service, and a function controlling interactions between the provider and the user of the service, wherein each of the rules specifies at least one of the provider of the service and the user of the service as a set of managed servers using a label set, wherein a label of the label set represents a dimension of the managed servers and a value of the dimension;

storing in association with a given rule of the plurality of rules, relevant actor-sets comprising a subset of the cached actor-sets that each include at least one of the provider specified in the given rule and the user specified in the given rule;

receiving an instruction to quarantine the bad actor;

updating the cached actor-sets to indicate a change in state of the bad actor to a quarantined state;

identifying a changed actor-set in the relevant actor-sets for the given rule, wherein the changed actor-set was updated based on the change in state of the bad actor to the quarantined state;

responsive to identifying the changed actor-set,
    sending, to the particular managed server, information describing the changed actor-set and an instruction to add, remove, or modify the changed actor-set in a local list stored by the particular managed server; and a computer processor for executing the computer program modules.

20. The system of claim 19, wherein the bad actor is a target managed server, the method further comprising:

determining, based on a description of the target managed server, currently-relevant rules that are applicable to the target managed server after it is quarantined;

determining whether the currently-relevant rules differ from previously-relevant rules that were applicable to the target managed server prior to it being quarantined; and responsive to determining that the currently-relevant rules differ from the previously-relevant rules: determining a rule that should be added, removed, or modified relative to the previously-relevant rules;

generating, based on the determined rule, a function-level instruction; and sending, to the target managed server, the function-level instruction and an instruction to add, remove, or modify the function-level instruction.

\* \* \* \* \*